(12) United States Patent
Gil et al.

(10) Patent No.: US 11,739,191 B2
(45) Date of Patent: Aug. 29, 2023

(54) REACTOR FOR CONTINUOUSLY TREATING POLYMERIC MATERIAL

(71) Applicant: GreenMantra Recycling Technologies Ltd., Brantford (CA)

(72) Inventors: Amalia Gil, Brantford (CA); Domenic Di Mondo, Brantford (CA); Radek Rybicki, Brantford (CA)

(73) Assignee: GreenMantra Recycling Technologies Ltd., Brantford (CA)

( * ) Notice: Subject to any disclaimer, the term of this patent is extended or adjusted under 35 U.S.C. 154(b) by 36 days.

(21) Appl. No.: 17/361,329

(22) Filed: Jun. 29, 2021

(65) Prior Publication Data

US 2021/0324172 A1    Oct. 21, 2021

Related U.S. Application Data

(63) Continuation of application No. 16/680,428, filed on Nov. 11, 2019, now Pat. No. 11,072,693, which is a
(Continued)

(51) Int. Cl.
*C08J 11/12* (2006.01)
*C10M 109/02* (2006.01)
(Continued)

(52) U.S. Cl.
CPC ............... *C08J 11/12* (2013.01); *B01F 25/42* (2022.01); *B01F 25/43141* (2022.01);
(Continued)

(58) Field of Classification Search
CPC ............. C08J 11/12; C08J 11/10; C08J 11/16; B01F 25/42; B01F 25/43141; B01F 2101/2805;
(Continued)

(56) References Cited

U.S. PATENT DOCUMENTS

| 2,549,538 A | 4/1951 | Sparks et al. |
| 3,033,256 A | 5/1962 | Schrenk |
| 3,143,536 A | 8/1964 | Guzzetta et al. |
| 3,332,926 A | 7/1967 | Baron et al. |
| 3,345,352 A | 10/1967 | Baron et al. |
| 3,424,822 A | 1/1969 | Liston |

(Continued)

FOREIGN PATENT DOCUMENTS

| CA | 2098778 A1 | 12/1993 |
| CA | 2162005 A1 | 5/1996 |

(Continued)

OTHER PUBLICATIONS

Tongkao, Practical Technology for Modification of Plastics, China Light Industry Press, Oct. 2012, pp. 44-45 and 49-50.
(Continued)

*Primary Examiner* — Prem C Singh
*Assistant Examiner* — Francis C Campanell
(74) *Attorney, Agent, or Firm* — Cook Alex Ltd.

(57) ABSTRACT

A system for continuously treating recycled polymeric material includes a hopper configured to feed the recycled polymeric material into the system. An extruder can turn the recycled polymeric material in a molten material. In some embodiments, the extruder uses thermal fluids, electric heaters, and/or a separate heater. The molten material is depolymerized in a reactor. In some embodiments, a catalyst is used to aid in depolymerizing the material. In certain embodiments, the catalyst is contained in a permeable container. The depolymerized molten material can then be cooled via a heat exchanger. In some embodiments, multiple reactors are used. In certain embodiments, these reactors are connected in series. In some embodiments, the reactor(s) contain removable static mixer(s) and/or removable annular inserts.

19 Claims, 20 Drawing Sheets

Related U.S. Application Data continuation of application No. 15/662,818, filed on Jul. 28, 2017, now Pat. No. 10,472,487, which is a continuation-in-part of application No. 15/394,390, filed on Dec. 29, 2016, now abandoned.

(60) Provisional application No. 62/273,411, filed on Dec. 30, 2015.

(51) Int. Cl.

| | | |
|---|---|---|
| *C08L 91/06* | (2006.01) | |
| *B01J 8/02* | (2006.01) | |
| *C08J 11/10* | (2006.01) | |
| *B01J 19/24* | (2006.01) | |
| *B01J 27/19* | (2006.01) | |
| *B29B 17/00* | (2006.01) | |
| *B29B 17/04* | (2006.01) | |
| *C08J 11/16* | (2006.01) | |
| *C10G 1/10* | (2006.01) | |
| *C10G 1/02* | (2006.01) | |
| *B01J 19/18* | (2006.01) | |
| *B09B 3/40* | (2022.01) | |
| *B01F 25/42* | (2022.01) | |
| *B01F 25/4314* | (2022.01) | |
| *C10N 50/10* | (2006.01) | |
| *B01F 101/00* | (2022.01) | |

(52) U.S. Cl.
CPC ........... *B01J 8/0221* (2013.01); *B01J 8/0278* (2013.01); *B01J 8/0285* (2013.01); *B01J 19/1818* (2013.01); *B01J 19/242* (2013.01); *B01J 19/245* (2013.01); *B01J 19/2415* (2013.01); *B01J 27/19* (2013.01); *B09B 3/40* (2022.01); *B29B 17/00* (2013.01); *B29B 17/04* (2013.01); *C08J 11/10* (2013.01); *C08J 11/16* (2013.01); *C08L 91/06* (2013.01); *C10G 1/02* (2013.01); *C10G 1/10* (2013.01); *C10M 109/02* (2013.01); *B01F 2101/2805* (2022.01); *B01J 2208/0084* (2013.01); *B01J 2208/00176* (2013.01); *B01J 2208/00407* (2013.01); *B01J 2208/00831* (2013.01); *B01J 2208/027* (2013.01); *B01J 2219/00761* (2013.01); *B01J 2523/00* (2013.01); *B29K 2023/06* (2013.01); *C08J 2323/06* (2013.01); *C10G 2300/1003* (2013.01); *C10N 2050/10* (2013.01); *Y02W 30/62* (2015.05)

(58) Field of Classification Search
CPC ...... B01J 8/0221; B01J 8/0278; B01J 8/0285; B01J 19/1818; B01J 2208/00176; B01J 2208/00407; B01J 2208/00831; B01J 2208/0084; B01J 2208/027; B01J 2523/00; B09B 3/40; B29B 17/00; B29B 17/04; C08L 91/06; C10G 1/10; C10M 109/02; B29K 2023/06; Y02W 30/62
USPC ........................................................ 585/241
See application file for complete search history.

(56) References Cited

U.S. PATENT DOCUMENTS

| | | |
|---|---|---|
| 3,441,628 A | 4/1969 | Raetzsch et al. |
| 3,927,693 A | 12/1975 | Johnston |
| 3,962,092 A | 6/1976 | Newman |
| 4,053,141 A | 10/1977 | Gussefeld |
| 4,059,525 A | 11/1977 | Krasnow |
| 4,105,806 A | 8/1978 | Watt |
| 4,127,619 A | 11/1978 | Godfrey |
| 4,136,251 A | 1/1979 | Bice et al. |
| 4,208,252 A | 6/1980 | Yoshida et al. |
| 4,620,032 A | 10/1986 | Doerr |
| 4,642,401 A | 2/1987 | Coenen et al. |
| 4,847,209 A | 7/1989 | Lewis et al. |
| 4,911,952 A | 3/1990 | Doane et al. |
| 5,158,982 A | 10/1992 | Stapp |
| 5,292,862 A | 3/1994 | Miura et al. |
| 5,314,741 A | 5/1994 | Roberts et al. |
| 5,315,055 A | 5/1994 | Butcher et al. |
| 5,354,930 A | 10/1994 | Atkins et al. |
| 5,369,215 A | 11/1994 | Platz |
| 5,386,055 A | 1/1995 | Lee et al. |
| 5,481,052 A | 1/1996 | Hardman et al. |
| 5,502,263 A | 3/1996 | Ponsford et al. |
| 5,656,757 A | 8/1997 | Jenczewski et al. |
| 5,672,794 A | 9/1997 | Northemann |
| 5,728,909 A | 3/1998 | Butcher, Jr. |
| 5,731,483 A | 3/1998 | Stabel et al. |
| 5,821,395 A | 10/1998 | Price et al. |
| 5,849,964 A | 12/1998 | Holighaus et al. |
| 5,876,644 A | 3/1999 | Nichols et al. |
| 6,143,940 A | 11/2000 | Miller et al. |
| 6,150,577 A | 11/2000 | Miller et al. |
| 6,172,271 B1 | 1/2001 | Horizoe et al. |
| 6,172,275 B1 | 1/2001 | Tadauchi et al. |
| 6,184,427 B1 | 2/2001 | Klepfer et al. |
| 6,211,331 B1 | 4/2001 | Craig |
| 6,288,296 B1 | 11/2001 | Miller et al. |
| 6,822,126 B2 | 11/2004 | Miller et al. |
| 7,834,226 B2 | 11/2010 | Miller |
| 7,893,307 B2 | 2/2011 | Smith |
| 7,923,506 B2 | 4/2011 | Cohoon et al. |
| 8,168,839 B2 | 5/2012 | Niu |
| 8,609,778 B1 | 12/2013 | Frost et al. |
| 8,664,458 B2 | 3/2014 | Kumar et al. |
| 8,680,167 B2 | 3/2014 | Agarwal et al. |
| 9,200,130 B2 | 12/2015 | D'Amato et al. |
| 9,353,476 B2 | 5/2016 | Henriksson et al. |
| 9,631,153 B2 | 4/2017 | Unger et al. |
| 9,714,385 B2 | 7/2017 | Khan et al. |
| 10,000,715 B2 | 6/2018 | Kumar et al. |
| 10,358,603 B1 | 7/2019 | Pour |
| 10,457,886 B2 | 10/2019 | Kumar et al. |
| 10,472,487 B2 | 11/2019 | Gil et al. |
| 10,519,292 B2 | 12/2019 | Yao et al. |
| 10,597,507 B2 | 3/2020 | Di Mondo et al. |
| 10,907,353 B2 | 2/2021 | LaTorre et al. |
| 11,072,676 B2 | 7/2021 | Di Mondo et al. |
| 11,192,999 B2 | 12/2021 | Yao et al. |
| 11,220,586 B2 | 1/2022 | Yao et al. |
| 11,319,493 B2 | 5/2022 | Daggupati et al. |
| 2003/0003554 A1 | 1/2003 | Miller et al. |
| 2003/0154885 A1 | 8/2003 | Krendlinger et al. |
| 2003/0199718 A1 | 10/2003 | Miller |
| 2004/0161570 A1 | 8/2004 | Zanchetta et al. |
| 2005/0148487 A1 | 7/2005 | Brownscombe et al. |
| 2005/0176866 A1 | 8/2005 | Krendlinger et al. |
| 2007/0117894 A1 | 5/2007 | Bach et al. |
| 2007/0263060 A1 | 11/2007 | Laksin et al. |
| 2009/0036619 A1 | 2/2009 | Herrmann et al. |
| 2009/0110925 A1 | 4/2009 | Fukuda et al. |
| 2009/0321317 A1 | 12/2009 | Widmer et al. |
| 2010/0227954 A1 | 9/2010 | Naidoo et al. |
| 2010/0233408 A1 | 9/2010 | Zickell et al. |
| 2011/0195256 A1 | 8/2011 | Morikawa et al. |
| 2012/0016169 A1* | 1/2012 | Kumar ..................... C10G 1/10 585/241 |
| 2012/0136107 A1 | 5/2012 | Fu et al. |
| 2012/0310023 A1 | 5/2012 | Huang et al. |
| 2012/0296036 A1 | 11/2012 | Allen et al. |
| 2012/0304879 A1 | 12/2012 | Tiessen et al. |
| 2013/0137794 A1 | 5/2013 | Kasper et al. |
| 2013/0137796 A1 | 5/2013 | Kropp |
| 2013/0180431 A1 | 7/2013 | Myszak, Jr. et al. |
| 2013/0303810 A1 | 11/2013 | Handerek |
| 2014/0023870 A1 | 1/2014 | Takamori |
| 2014/0046102 A1* | 2/2014 | D'Amato ................. C08J 11/00 585/17 |

(56) References Cited

U.S. PATENT DOCUMENTS

| | | |
|---|---|---|
| 2014/0107307 A1 | 4/2014 | Frost et al. |
| 2014/0182194 A1 | 7/2014 | Unger et al. |
| 2014/0299017 A1 | 10/2014 | Parvez et al. |
| 2015/0105496 A1 | 4/2015 | Naidoo et al. |
| 2015/0203731 A1 | 7/2015 | Herrlich et al. |
| 2015/0210611 A1 | 7/2015 | Tippet et al. |
| 2015/0247096 A1 | 9/2015 | Barger et al. |
| 2015/0322263 A1 | 11/2015 | Hilsenbeck |
| 2015/0361374 A1 | 12/2015 | Kumar et al. |
| 2016/0024390 A1 | 1/2016 | Ullom |
| 2016/0040074 A1 | 2/2016 | Methling |
| 2017/0232416 A1 | 8/2017 | Gil et al. |
| 2017/0283525 A1 | 10/2017 | Li et al. |
| 2017/0290945 A1 | 10/2017 | Hanson et al. |
| 2018/0127522 A1 | 5/2018 | Land et al. |
| 2018/0312694 A1 | 11/2018 | Naidoo et al. |
| 2018/0371325 A1 | 12/2018 | Streiff et al. |
| 2019/0119191 A1 | 4/2019 | Streiff et al. |
| 2020/0172779 A1 | 6/2020 | Di Mondo |
| 2021/0061971 A1 | 3/2021 | Delferro et al. |
| 2021/0087113 A1 | 3/2021 | Di Mondo et al. |
| 2021/0108154 A1 | 4/2021 | Scheibel et al. |
| 2022/0089831 A1 | 3/2022 | Kanattukara et al. |
| 2022/0112352 A1 | 4/2022 | Nagy et al. |

FOREIGN PATENT DOCUMENTS

| | | |
|---|---|---|
| CA | 2202941 A1 | 10/1998 |
| CA | 2805570 A1 | 1/2012 |
| CA | 2812961 A1 | 1/2012 |
| CA | 2822678 A1 | 2/2014 |
| CA | 2883204 A1 | 3/2014 |
| CA | 2898257 A1 | 7/2014 |
| CA | 3129563 A1 | 7/2014 |
| CA | 2885144 A1 | 3/2015 |
| CA | 2890874 A1 | 11/2015 |
| CA | 2822678 C | 5/2017 |
| CA | 2981710 A1 | 4/2018 |
| CH | 646717 A5 | 12/1984 |
| CN | 1120347 A | 4/1996 |
| CN | 01205390 A | 6/2008 |
| CN | 01205402 A | 6/2008 |
| CN | 101434821 B | 5/2009 |
| CN | 101502993 A | 8/2009 |
| CN | 101704932 A | 5/2010 |
| CN | 101970095 A | 2/2011 |
| CN | 102205220 A | 10/2011 |
| CN | 102989338 A | 3/2013 |
| CN | 103509496 A | 1/2014 |
| CN | 103168016 A | 4/2015 |
| CN | 104552735 A | 4/2015 |
| CN | 104847921 A | 8/2015 |
| CN | 104877699 A | 9/2015 |
| CN | 104910511 A | 9/2015 |
| CN | 105102519 A | 11/2015 |
| CN | 105153511 A | 12/2015 |
| CN | 105219406 A | 1/2016 |
| CN | 105315391 A | 2/2016 |
| CN | 106413876 A | 2/2017 |
| CN | 106700975 A | 5/2017 |
| CN | 106753057 A | 5/2017 |
| CN | 107286277 A | 10/2017 |
| CN | 107629565 A | 1/2018 |
| CN | 206983219 U | 2/2018 |
| CN | 108883551 B | 11/2018 |
| CN | 110105474 A | 8/2019 |
| CN | 113185626 A | 7/2021 |
| CN | 113462175 A | 10/2021 |
| DE | 1570194 A1 | 8/1969 |
| DE | 3642273 A1 | 4/1987 |
| DE | 19500425 C1 | 4/1996 |
| DE | 69323125 T2 | 8/1999 |
| DE | 10037229 A1 | 2/2000 |
| DE | 10022666 A1 | 11/2001 |
| DE | 102018214702 A1 | 9/2019 |
| EP | 0577279 A1 | 1/1994 |
| EP | 0717094 A1 | 6/1996 |
| EP | 0577279 B1 | 1/1999 |
| EP | 1707614 A1 | 10/2006 |
| EP | 2161299 A1 | 3/2010 |
| EP | 2283094 B1 | 10/2012 |
| EP | 3397442 A1 | 11/2018 |
| EP | 3414295 A1 | 12/2018 |
| EP | 3441136 A1 | 12/2020 |
| EP | 3867312 A1 | 8/2021 |
| ES | 539973 | 4/1986 |
| GB | 569043 A | 5/1945 |
| GB | 1310260 A | 3/1973 |
| GB | 1563440 A | 3/1980 |
| JP | S51125412 A | 11/1976 |
| JP | S59217777 A | 12/1984 |
| JP | H03292305 A | 12/1991 |
| JP | H0457887 A | 2/1992 |
| JP | H04100807 A | 4/1992 |
| JP | H05085964 A | 4/1993 |
| JP | H06179877 A | 6/1994 |
| JP | H08508520 A | 9/1996 |
| JP | H08253601 A | 10/1996 |
| JP | H11302663 A | 11/1999 |
| JP | H122000512209 A | 9/2000 |
| JP | H142002167466 A | 6/2002 |
| JP | H142002224652 A | 8/2002 |
| JP | H142002256103 A | 9/2002 |
| JP | H152003252676 A | 9/2003 |
| JP | H152003292594 A | 10/2003 |
| JP | H162004131675 A | 4/2004 |
| JP | H172005170986 A | 6/2005 |
| JP | H172005200573 A | 7/2005 |
| JP | H172005527672 A | 9/2005 |
| JP | H182006056957 A | 3/2006 |
| JP | H182006143802 A | 6/2006 |
| JP | H192007169531 A | 7/2007 |
| JP | H192007529574 A | 10/2007 |
| JP | H252013539476 A | 10/2013 |
| JP | H272015512965 A | 4/2015 |
| JP | H272015512972 A | 4/2015 |
| JP | H282016523986 A | 8/2016 |
| JP | H292017513964 A | 6/2017 |
| JP | R12019508524 A | 3/2019 |
| KR | 100899029 B1 | 5/2009 |
| KR | 20110051520 A | 5/2011 |
| RO | 131874 A2 | 5/2017 |
| WO | 1989000419 A1 | 1/1989 |
| WO | 2000027942 A1 | 5/2000 |
| WO | 2002090403 A1 | 11/2002 |
| WO | 2005092963 A1 | 10/2005 |
| WO | 2010023173 A1 | 3/2010 |
| WO | 2010081054 A1 | 7/2010 |
| WO | 2010099963 A1 | 9/2010 |
| WO | 2012007833 A2 | 1/2012 |
| WO | 2014110644 A1 | 7/2014 |
| WO | 2014161767 A2 | 10/2014 |
| WO | 2015130545 A1 | 9/2015 |
| WO | 2015164017 A1 | 10/2015 |
| WO | 2015164331 A1 | 10/2015 |
| WO | 2017113020 A1 | 7/2017 |
| WO | 2017136957 A1 | 8/2017 |
| WO | 2017139333 A1 | 8/2017 |
| WO | 2017161463 A1 | 9/2017 |
| WO | 2017167947 A1 | 10/2017 |
| WO | 2018058257 A1 | 4/2018 |
| WO | 2018158285 A1 | 9/2018 |
| WO | 2019041049 A1 | 3/2019 |
| WO | 2019195915 A1 | 10/2019 |
| WO | 2019227233 A1 | 12/2019 |
| WO | 2022015971 A1 | 1/2022 |

OTHER PUBLICATIONS

Notice of Acceptance dated Jan. 4, 2022, issued in connection with Australian Application No. 2017333737.

Extended European Search Report dated Feb. 16, 2022, issued in connection with European Application No. EP 19811163.5.

(56) References Cited

OTHER PUBLICATIONS

Examination Report dated Mar. 1, 2022, issued in connection with European Application No. 17769226.6.
International Preliminary Report on Patentability dated Mar. 1, 2022 in connection with International Application No. PCT/CA2020/051166.
Office Action dated Mar. 1, 2022, issued in connection with Mexican Application No. MX/a/2018/008117.
Office Action dated Mar. 2, 2022, issued in connection with Chinese Application No. 201780018293.8.
Office Action dated Apr. 5, 2022, issued in connection with Japanese Application No. 2019-517089.
Office Action dated May 13, 2022, issued in connection with Brazilian Application No. BR 11 2020 004155 6.
International Preliminary Report on Patentability dated May 17, 2022 in connection with International Application No. PCT/CA2020/000141.
Extended European Search Report dated Jun. 3, 2022, issued in connection with European Application No. 19894673.3.
Office Action dated Jun. 10, 2022, issued in connection with Thai Application No. 1801005835.
Office Action dated Jun. 21, 2022, issued in connection with Chinese Application No. 201780018293.8.
Office Action dated Jul. 1, 2022, issued in connection with Brazilian Application No. BR 11 2018 068992 0.
Office Action dated Jul. 13, 2022, issued in connection with Brazilian Application No. BR 11 2020 010448 5.
Office Action dated Aug. 23, 2022, issued in connection with Brazilian Application No. BR 11 2020 024507 0.
Office Action dated Sep. 23, 2022, issued in connection with Brazilian Application No. BR 11 2019 006300 5.
Office Action dated Nov. 17, 2022, issued in connection with Canadian Application No. 3,013,953.
Extended European Search Report dated Nov. 21, 2022, issued in connection with European Application No. 20784475.4.
Tordella et al., "Isomorphic Interactions of Ethylenic Polymers and Paraffin Wax", J. of Polymer Science, vol. 8, 1970, pp. 81-87.
Yu, Peroxide modified polyolefin blends Part 1: Effects on LDPE/PP blends with components with similar initial viscosities, Adv. Polymer Tech., vol. 10(3), 1990, pp. 163-172.
Handbook of Adhesives Technology & Application, Beijing Adhesive Society, Aerospace Press, 1991, pp. 735-736.
Oldshue, "Fluid Mixing Technology", Chem. Industry Press, 1991, p. 279.
Teh, A Review of polyethylene-polypropylene blend and their compatibilization, Adv. Polymer Tech., vol. 13(1), 1994, pp. 1-23.
Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.
Ding et al., Thermal and catalytic degradation of high density polyethylene and commingled post-consumer plastic waste, Fuel Processing Technology, Mar. 1997, vol. 51, Issues 1-2, pp. 47-62.
Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.
Buekens et al., Catalytic plastics cracking for recovery of gasoline-range hydrocarbons from municipal plastic wastes, Resources, Conservation and Recycling, Aug. 1998, vol. 23, Issue 3, pp. 163-181.
Kartalis et al., Recycling of post-used PE packaging film using the restabilization technique, Poly. Degrad. And Stab., 2000, vol. 70(2), pp. 189-197.
Luo et al., Catalytic degradation of high density polyethylene and polypropylene into liquid fuel in a power-particle fluidized bed, Polymer Degradation and Stability, online, 2000, vol. 70(1), pp. 97-102.

Predel, "Pyrolysis of mixed polyolefins in a fluidised-bed reactor and on a pyro-GCMS to yield aliphatic waxes"; Polymer Degradation and Stability, 2000, vol. 70(3), pp. 373-385.
You et al., Liquid-phase catalytic degradation of polyethylene wax over silica modified zeolite catalysts, Polymer Degradation and Stability, 2001, vol. 265(2), pp. 329-336.
Seo et al., Investigation of Catalytic degradation of HDPE by hydrocarbon group type analysis, Journal of Analytical and Applied Pyrolysis, 2003, vol. 70, Issue 2, pp. 97-102.
Lai et al., Depolymerization of HDPE to wax in the presence of a catalyst formed by homonuclear macrocyclic zirconium complex chemically bonded to alumina support, Journal of Molecular Applied Catalysis A: General, 2006, vol. 303(1), pp. 9-17.
Mpanza et al., "Influence of Different Waxes on the Physical Properties of Linear Low-density Polyethylene", South Africa J. of Chem., vol. 59, 2006, pp. 48-54.
Lai et al., Development of heterogeneous catalyst by ionically bonding macrocyclic Zr—Zr complex to montmorillonite clay for depolymerization of polypropylene, Journal of Molecular Applied Catalysis A: Chemical, 2007, vol. 265(1-2), pp. 15-24.
Rosa et al., Processing and thermal, mechanical and morphological characterization of post-consumer polyolefins/thermoplastic starch blends, J. of Mat. Sci., 2007, 42(2), pp. 551-557.
Urbaniak et al. "Waxes—Products of Thermal Degradation of Waste Plastics—Obtaining, Capabilities, and Application", Archives of Waste Management and Environmental Protection, vol. 6, 2007, pp. 71-78.
Requena et al., "Encapsulation of Leu-Enkephalin in core-shell isobutylcyanoacrylate-thiolated chitosan nanoparticles for oral administration", J. Chilean Chem. Soc., 2008, vol. 53(4), pp. 1677-1681.
Halley et al., "Chemorheology of Polymers—From Fundamental Principles to Reactive Processing", Cambridge University Press, 2009, pp. 1-168.
Garcia et al., Recycling extruded polystyrene by dissolution with suitable solvents, J. of Mat. Cycles and Waste Management, 2009, vol. 11(1), pp. 2-5.
Aboulkas, Thermal degradation behaviors of polyethylene and polypropylene. Part 1: pyroloysis kinetics and mechanisms, Energy Conversion and Management, 2010, vol. 51, pp. 1363-1369.
Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.
Shang et al., "Pyrolyzed Wax from Recycled Cross-Linked Polyethylene as Warm Mix Asphalt (WMA) Additive for SBS Modified Asphalt", Progress in Rubber, Plastics and Recycling Technology, vol. 27, 2011, pp. 133-144.
Arabiourrutia, "Characterization of the waxes obtained by the pyrolysis of polyolefin plastics in a conical spouted bed reactor"; Journal of Analytical and Applied Pyrolysis, 2012, vol. 94, pp. 230-237.
Xanthos, Recycling of the #5 polymer, Science, 2012, vol. 337, pp. 700-702.
Farahanchi et al., Effects of ultrahigh speed twin screw extrusion on the thermal and mechanical degradation of polystyrene, Polymer Engineering, 2016, vol. 6(7), pp. 743-751.
European Search Report dated Apr. 4, 2011 in connection with European Patent Application No. 10172039.
Extended European Search Report dated Apr. 15, 2011 in connection with European Patent Application No. 10172039.9-2104.
International Search Report and Written Opinion dated Jan. 5, 2012 in connection with International Patent Application No. PCTIB2011001642.
International Preliminary Report on Patentability dated Aug. 1, 2012, in connection with International Application No. PCTIB2011001642.
International Search Report and Written Opinion dated Sep. 20, 2013 in connection with International Application No. PCTCA2013000041.
Office Action dated Apr. 4, 2014 in connection with Chinese Application No. 201180034887.0.
Kaitz et al., "Depolymerizable polymers:preparation, applications, and future outlook", MRS Comm., 2015, vol. 5, pp. 191-204.

(56) References Cited

OTHER PUBLICATIONS

"SCRA Spinout Case Study—Recycling Technologies", Sep. 2015, pp. 1-3, Retrieved from the Internet: https://warwick.ac.uk/fac/crossfac/sciencecity/casestudies/recycling-tecnnologies/ [retrieved on Aug. 22, 2019].
Office Action dated Jun. 16, 2015 in connection with Japanese Application No. 2013-519172.
International Preliminary Report on Patentability dated Jul. 21, 2015 in connection with International Application PCTCA2013000041.
Office Action dated Oct. 15, 2015 in connection with Malaysian Patent Application No. 2013000128.
Office Action dated Feb. 29, 2016 in connection with Chinese Application No. 201510126290.9.
Office Action dated Oct. 5, 2016 in connection with Canadian Application No. 2805570.
Office Action dated Oct. 6, 2016 in connection with Canadian Application No. 2898257.
Gergo, P. et al. "Rheological Investigation of Rubber Bitumen Containing Various Waxes as Warm Mix Additive" Studia UBB Chemia LXII, 2 Tom II, 2017 p. 247-257.
International Search Report and Written Opinion dated Mar. 17, 2017 in connection with International PCTCA2016051555.
International Search Report and Written Opinion dated May 2, 2017 in connection with PCT/CA2017/050172.
International Search Report and Written Opinion dated Jul. 25, 2017 in connection with International Application No. PCT/CA2017/050378.
Office Action dated Nov. 30, 2017 in connection with Indian Application No. 316/KOLNP/2013.
International Search Report & Written Opinion dated Dec. 15, 2017 in connection with International Application No. PCT/CA2017/051166.
Ferraz et al., "Polystyrene recycling processes by dissolution in ethyl acetate", Journal of Applied Polymer Science, 2018.
"Changing the Story of Waste Plastic (Crowdcube presentation)", Feb. 2018, Retrieved from the Internet: https://hkstartupresources.com/wpcontent/uploads/2018/02/recycling-technologies-ltdbusiness-plan.pdf [retrieved on Aug. 22, 2019].
Takuma, "Production of Aromatic Hydrocarbons by Catalytic Degradation of Polyolefins Over H-Gallosilicate", Ind. Eng. Chem. Res., 2001, pp. 1076-1082.
Sari et al. "Recycling of Polyolefin Materials", Springer Series on Polymer and Composite Materials, (2016), pp. 315-339.
Sukorez® SU-90, Kolon Industries (Year: 2016).
"GreenMantra Technologies Introduces Ceranovus Wax Modifiers for Improved Asphalt Roofing Production and Performance", Sep. 12, 2016 pp. 1-3, Retrieved from the Internet: URL:https://www.prnewswire.com/news-releases/greenmantratechnologies-introduces-ceranovus-wax-modifiers-for-improved-asphaltroofing-production-and-performance [retrieved on Nov. 18, 2021].
DiMondo "An Added Benefit (Ceranovus A115 and A125)", Jan. 12, 2017, pp. 1-9, Retrieved from the Internet: https://www.professionalroofing.net/Articles/An-added-benefit [retrieved on Nov. 18, 2021].
"GreenMantra Technologies Introduce Ceranovus Polymer Additives at IRE", Feb. 6, 2018, Retrieved from the Internet https://www.roofingcontractor.com/articles/92693-greenmantratechnologies-introduce-ceranovus-polymer-additives-at-ire [retrieved on Nov. 18, 2021].
Notice of Acceptance dated Oct. 20, 2021 for Australian App. No. 2017218908.
European Search Report dated Oct. 20, 2021 issued in connection with European App. No. 18882986.5.
European Search Report dated Nov. 11, 2021 issued in connection with European App. No. 16880228.8.
European Search Report dated Nov. 29, 2021 issued in connection with European App. No. 19810083.6.
International Preliminary Report on Patentability dated Jul. 12, 2018 in connection with International Application No. PCT/CA2016/051555.
International Preliminary Report on Patentability dated Aug. 23, 2018 in connection with PCT/CA2017/050172.
International Preliminary Report on Patentability dated Oct. 4, 2018 in connection with International Application No. PCT/CA2017/050378.
International Search Report and Written Opinion dated Nov. 16, 2018 in connection with PCT/CA2018/051058.
International Search Report and Written Opinion dated Feb. 5, 2019 in connection with International application No. PCT/CA2018/051517.
International Preliminary Report on Patentability dated Apr. 11, 2019 in connection with International Application No. PCT/CA2017/051166.
Examination Report No. 1 dated May 1, 2019 in connection with Australian application No. 2018204945.
International Search Report and Written Opinion dated Jul. 4, 2019 in connection with International Application No. PCT/CA2019/000046.
International Search Report and Written Opinion dated Jul. 12, 2019 in connection with International Application No. PCT/CA2019/050762.
International Search Report and Written Opinion dated Jul. 26, 2019 in connection with International Application No. PCT/CA2019/050761.
Extended European Search Report dated Aug. 23, 2019 issued in connection with EP. App. No. 16880228.8.
Extended European Search Report dated Sep. 4, 2019 issued in connection with EP App. No. 17769226.6.
Notice of Acceptance for Patent Application dated Sep. 6, 2019 in connection with Australian App. No. 2018204945.
Extended European Search Report dated Oct. 7, 2019 issued in connection with EP. App. No. 17749885.4.
Office Action dated Jan. 13, 2020 in connection with Brazilian App. No. 11 2013 001058 4.
Canadian Office Action dated Jan. 24, 2020 issued in connection with Canadian App. No. 2898257.
Examination Report No. 1 dated Feb. 26, 2020 in connection with Australian App. No. 2017239181.
Office Action dated Feb. 28, 2020 in connection with Brazilian App. No. 11 2018 013600 0.
Office Action dated Mar. 2, 2020 in connection with Chinese Application No. 201680082803.3.
International Preliminary Report on Patentability dated Mar. 3, 2020 in connection with International Application No. PCT/CA2018/051058.
International Search Report and Written Opinion dated Mar. 19, 2020 in connection with International Application No. PCT/CA2019/051814.
Partial European Search Report dated Mar. 20, 2020 in connection with European Application No. 17854306.2.
Office Action dated Apr. 28, 2020 in connection with Canadian Application No. 2898257.
Office Action dated May 26, 2020 in connection with Japanese Application No. 2018-534826.
International Search Report and Written Opinion dated Jun. 9, 2020 in connection with International Application No. PCT/CA2020/050439.
Office Action dated Jun. 15, 2020 in connection with Chinese Application No. 201780011193.2.
Extended European Search Report dated Jun. 29, 2020 in connection with European Application No. 17854306.2.
Office Action dated Jun. 30, 2020 in connection with Japanese Application No. 2018-542700.
Notice of Allowance dated Jul. 1, 2020 in connection with Brazilian App. No. 11 2013 001058 4.
Notice of Allowance dated Oct. 13, 2020 for Japanese App. No. 2018-534826.
Office Action dated Oct. 22, 2020 in connection with Chinese Application No. 201680082803.3.
Office Action dated Nov. 24, 2020 in connection with Japanese Application No. 2018-542700.
Canadian Office Action dated Nov. 25, 2020 issued in connection with Canadian App. No. 3096804.

(56) References Cited

OTHER PUBLICATIONS

Notice of Acceptance dated Nov. 30, 2020 for Australian App. No. 2017239181.
International Search Report and Written Opinion dated Nov. 30, 2020 in connection with International Application No. PCT/CA2020/051166.
Extended European Search Report dated Dec. 17, 2020 issued in connection with EP. App. No. 16880228.8.
Office Action dated Feb. 2, 2021 in connection with Chinese Application No. 201780018293.8.
Office Action dated Feb. 9, 2021 in connection with Chinese Application No. 201780011193.2.
Examination Report No. 1 dated Mar. 30, 2021 in connection with Australian application No. 2017333737.
International Search Report and Written Opinion dated Apr. 15, 2021 in connection with International Application No. PCT/CA2020/000141.
Canadian Office Action dated Apr. 20, 2021 issued in connection with Canadian App. No. 3096804.
Extended European Search Report dated May 3, 2021 issued in connection with EP. App. No. 18851118.2.
Office Action dated Jun. 3, 2021 in connection with Chinese Application No. 201780059004.9.
Office Action dated Jul. 5, 2021 in connection with Brazilian App. No. 11 2018 016499 2.
Office Action dated Jul. 6, 2021 issued in connection with JP App. No. 2019-517089.
Office Action dated Jul. 29, 2021 in connection with Brazilian App. No. 11 2018 068992 0.
Office Action dated Aug. 12, 2021 in connection with Brazilian App. No. 11 2019 006300 5.
Office Action dated Aug. 30, 2021 in connection with Mexican App. No. MX/a/2018/008117.
Examination Report No. 1 dated Sep. 8, 2021 in connection with Australian application No. 2017218908.
European Office Action dated Oct. 5, 2021 issued in connection with European App. No. 17854306.2.
Office Action dated Oct. 24, 2022, issued in connection with Brazilian Application No. BR 11 2020 024525 9.
Examination Report dated Dec. 20, 2022, issued in connection with European Application No. 16 880 228.8.
Office Action dated Jan. 13, 2023, issued in connection with Canadian Application No. 3,129,563.
Office Action dated Feb. 6, 2023, issued in connection with Canadian Application No. 3,009,917.
Extended European Search Report dated Feb. 9, 2023, issued in connection with European Patent Application No. 22179677.4.
Perez, Ignacio et al., "Use of Lignin Biopolymer From Industrial Waste as Bitumen Extender for Asphalt Mixtures", Journal of Cleaner Production, vol. 220, pp. 87-98, XP085643290, ISSN: 0959-6526, DOI: 10.1016/J.JCEPRO.2019.02.08.
White, "Laboratory Evaluation of Asphalt Containing Recycled Plastic as a Bitumen Extended and Modifier", Oct. 28, 2019, Journal of Traffic and Transportation Engineering, vol. 7, No. 5, retrieved from the internet: https://www.researchgate.net/profile/Greg-White/publication/337210894_Laboratory_Evaluation_of_Asphalt_Containing_Recycled Plastic_as_a_Bitumen_Extender_and_Modifier.pdf.
Office Action dated Mar. 20, 2023, issued in connection with Canadian Application 3,015,859.
Office Action dated Apr. 25, 2023, issued in connection with Mexican Application No. MX/a/2018/009808.
Examination Report dated May 17, 2023, issued in connection with European Application No. 20858584.4.
Office Action dated May 19, 2023, issued in connection with Mexican Application No. MX/a/2018/011492.

\* cited by examiner

REACTOR FOR CONTINUOUSLY TREATING POLYMERIC MATERIAL

CROSS-REFERENCE TO RELATED APPLICATION

This application is a continuation of U.S. patent application Ser. No. 16/680,428 filed on Nov. 11, 2019, entitled "Reactor For Continuously Treating Polymeric Material". The '428 application is a continuation of U.S. patent application Ser. No. 15/662,818 filed on Jul. 28, 2017, entitled "Reactor For Continuously Treating Polymeric Material". The '818 application is a continuation-in-part of U.S. patent application Ser. No. 15/394,390 filed on Dec. 29, 2016, also entitled "Reactor For Continuously Treating Polymeric Material" which is related to and claims priority benefits from U.S. provisional patent application Ser. No. 62/273,411 filed on Dec. 30, 2015, entitled "Reactor For Continuously Treating Polymeric Material". The '428, '818, '390 and '411 applications are hereby incorporated by reference herein in their entireties.

FIELD OF THE INVENTION

The present invention relates to a method of assembling a reactor for treating polymeric material, and using the reactor to treat polymeric material.

BACKGROUND OF THE INVENTION

Manufacturers of mechanical equipment, food packagers, and other users of wax and grease for lubricating, sealing have a continuing need for wax and grease compositions. Manufacturing these waxes and greases is expensive due to the requirement of pricey petroleum feed in the manufacturing process.

It would be advantageous to employ readily available polyethylene waste and recycle them to produce waxes and greases at lower cost.

It would be advantageous to have a relatively inexpensive process for producing wax and grease base stock. Such a process would ideally employ a readily available inexpensive feedstock and use an inexpensive process. Waste plastics/polymers have been used in known processes for the manufacture of such products. Plastic waste is among the fastest growing solid waste and employing this solid waste to produce useful wax and grease addresses growing plastic disposal problems.

Further, the majority of the polymer/plastics waste may be polyethylene and due to its non-biodegradability, it has been accumulating in nature. Polyethylene waste in general is either land-filled or burnt-former leads to the loss of material and waste of land while the latter results in emission of green-house-gases; only a small proportion of entire plastic waste is currently being recycled as secondary polymers which have poor quality and give low financial returns.

In recent times, there have been considerable efforts to convert these polymeric solid wastes into useful products such as fuels, lubricants, waxes and grease base stocks. Existing conversion processes may not be efficient enough and can release green-house gases into environment. Further, current techniques may be sensitive to quality and quantity of waste plastic feed and they can have an impact on the end product quality. This can be especially important as plastic waste can vary in its consistency due to the varying plastic grades.

It is desirable to provide a reactor system which is sufficiently versatile so as to be able to generate different grades of products without requiring substantial changes to operating conditions or throughput.

SUMMARY OF THE INVENTION

In one specific aspect, the process of generating reaction products from polymeric material comprises:
(a) assembling a first reactor having a first reaction zone and including a total number of "P" reactor modules from "N" reactor modules, wherein "N" is a whole number that is greater than or equal to one, wherein each one of the "N" reactor modules defines a respective module reaction zone including a catalyst material disposed therein, and is configured for conducting a flow of reactor-disposed molten polymeric material through the respective module reaction zone, such that, flowing of the reactor-disposed molten polymeric material through the respective module reaction zone effects contacting of the flowing reactor-disposed molten polymeric material with the catalyst material, thereby effecting depolymerization of the flowing reactor-disposed molten polymeric material, and wherein, when "N" is a whole number that is greater than or equal to two, each one of the "N" reactor modules is configured for connection, in series, to one or more of the other ones of the "N" reactor modules such that a plurality of reactor modules are connected to one another, in series, and includes a plurality of module reaction zones that are disposed in fluid communication within one another, in series, such that the total number of module reaction zones correspond to the total number of connected reactor modules, and wherein the plurality of connected reactor modules is configured for conducting a flow of reactor-disposed molten polymeric material through the plurality of module reaction zones, such that, flowing of the reactor-disposed molten polymeric material through the plurality of module reaction zones effects contacting of the flowing reactor-disposed molten polymeric material with the catalyst material, thereby effecting depolymerization of the flowing reactor-disposed molten polymeric material, such that the first reaction zone includes "P" module reaction zones, wherein, when "P" is a whole number that is greater than or equal to two, the assembling of the first reactor includes connecting the "P" reactor modules to one another, in series, such that "P" reaction zones are disposed in fluid communication with one another in series;
(b) heating polymeric material to generate a molten polymeric material;
(c) flowing the molten polymeric material through the first reaction zone to effect generation of a first depolymerization product material;
(d) collecting the first depolymerization product material;
(e) suspending the flowing of the molten polymeric material through the first reaction zone; and
(f) modifying the first reactor, such that, when "P" is equal to one, the modifying includes connecting a total number of "R" of the "N−1" reactor modules, which have not been used in the assembly of the first reactor, to the first reactor, wherein "R" is a whole number from 1 to "N−1", such that another reactor is created and includes a total number of "R+1" reactor modules that are connected to one another, in series, and such that the another reactor includes a second reaction zone including "R+1" module reaction zones, wherein the another reactor is configured to conduct a flow of molten polymeric material, such that flowing of the reactor-disposed molten polymeric material through the second reaction zone effects generation of another depolymerization product material and its discharge from the another reactor; and when "P" is a whole number that is greater than or equal to two, but less than or equal to "N−1", the modifying includes either one of: (a) removing a total number of "Q" of the "P" reactor modules from the first reactor, wherein "Q" is a whole number from one to "P−1", such that another reactor is created and includes a total number of "P−Q" reactor modules that are connected to one another, in series, and such that the another reactor includes a second reaction zone including "P−Q" module reaction zones, wherein the another reactor is configured to conduct a flow of molten polymeric material, such that flowing of the reactor-disposed molten polymeric material through the second reaction zone effects of generation of another depolymerization product material and its discharge from the another reactor, or (b) connecting a total number of "R" of the "N−P" reactor modules, which have not been used in the assembly of the first reactor, to the first reactor, wherein "R" is a whole number from 1 to "N−P", such that another reactor is created and includes a total number of "P+R" reactor modules that are connected to one another, in series, and also includes a second reaction zone including "P+R" module reaction zones, wherein the another reactor is configured to conduct a flow of molten polymeric material, such that flowing of the reactor-disposed molten polymeric material through the second reaction zone effects generation of another depolymerization product material and its discharge from the another reactor; and when "P" is equal to "N", the modifying includes removing a total number of "Q" of the "P" reactor modules from the first reactor, wherein "Q" is a whole number from one to "P−1", such that another reactor is created and includes a total number of "P−Q" reactor modules that are connected to one another, in series, and such that the another reactor includes a second reaction zone, including "P−Q" module reaction zones, wherein the another reactor is configured to conduct a flow of molten polymeric material, such that flowing of the reactor-disposed molten polymeric material through the second reaction zone effects generation of another depolymerization product material and its discharge from the another reactor.

A method for continuously treating polymeric material can include selecting a solid polymeric material; heating the solid polymeric material in an extruder to create a molten polymeric material; filtering the molten polymeric material; placing the molten polymeric material through a chemical depolymerization process in a reactor to create a depolymerized polymeric material; cooling the depolymerized polymeric material; and purifying the depolymerized polymeric material. In some embodiments, the method can also include using the gas and oil created during the purification of the depolymerized polymeric material to run part of the method.

In some embodiments, the filtering involves a screen charger or a filter bed. In certain embodiments, the solid polymeric material is a recycled plastic.

In some embodiments, the depolymerization process utilizes a catalyst such as [Fe—Cu—Mo—P]/$Al_2O_3$. In other or the same embodiments, the depolymerization process utilizes a second reactor. In certain embodiments, the reactors are connected in series, stacked vertically, and/or stacked horizontally.

In some embodiments, the reactor(s) include(s) static mixer(s).

In some embodiments, the purification utilizes one of flash separation, absorbent beds, clay polishing or film evaporators.

A system for continuously treating recycled polymeric material can include a hopper configured to feed the recycled polymeric material into the system; an extruder configured to turn the recycled polymeric material in a molten material; a first reactor configured to depolymerize the molten material; a heat exchanger configured to cool the depolymerized molten material; a second reactor; and/or a separate heater configured to aid the extruder.

In certain embodiments, the extruder utilizes thermal fluid(s) and/or electric heater(s). In some embodiments, the reactors are connected in series and/or utilize a catalyst such as [Fe—Cu—Mo—P]/$Al_2O_3$. In some embodiments, the catalyst can be contained in a permeable container.

In certain embodiments, the reactor(s) contains spacer tube(s), static mixer(s) and/or annular insert(s). In certain embodiments, the static mixer(s) and/or annular insert(s) are removable.

DETAILED DESCRIPTION OF ILLUSTRATIVE EMBODIMENT(S)

A process of treating polymeric material, such as waste polymeric material, within a reactor of a system is described below. Suitable waste polymeric material includes waste plastic material. Virgin plastics can also be used.

Figure 1:
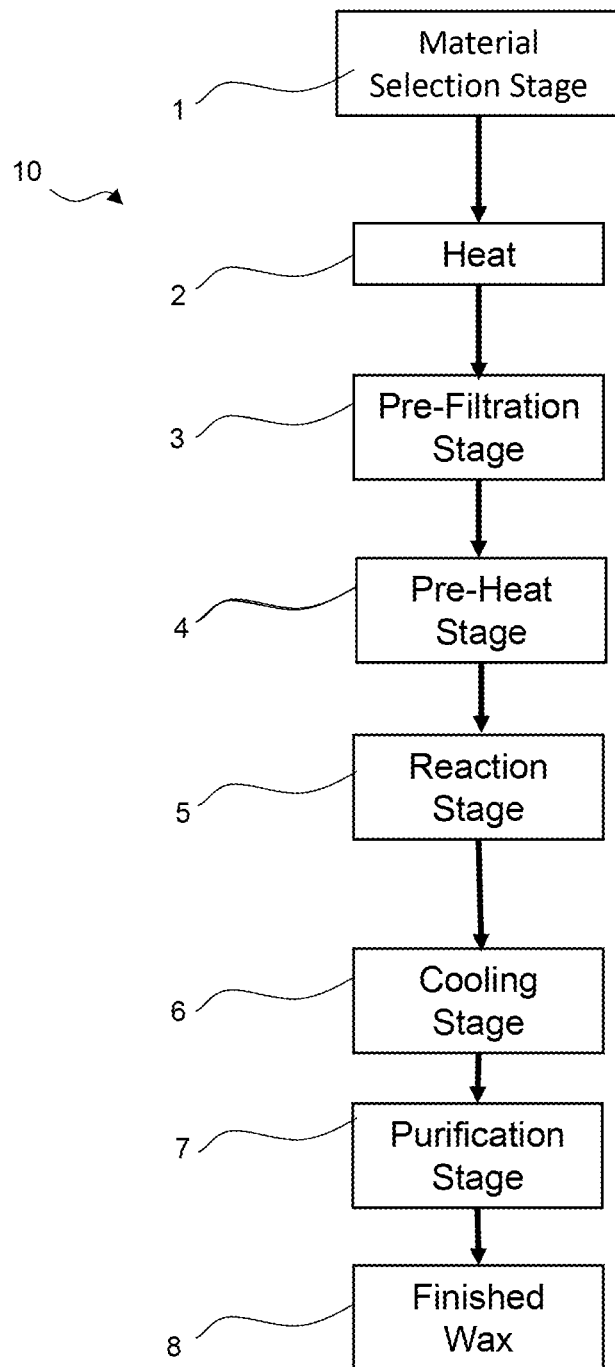
FIG. 1 is a flowchart illustrating a process for treating polymeric material.

FIG. 1 illustrates Process 10 for treating polymeric material. Process 10 can be run in batches, but more preferably is a continuous process. The parameters of Process 10, including but not limited to temperature, flow rate of plastic and total number of pre-heat, reaction, or cooling segments, can be modified to create end products of varying molecular weights. For example, raising the temperature and/or decreasing the flow rate through the reaction sections or changing the number of reaction sections will result in the product of a lower molecular weight.

In Material Selection Stage 1, polymeric feed is selected and/or prepared for treatment. In some embodiments, the polymeric feed in sorted/selected to include polyethylene material. In other embodiments, the polymeric feed in sorted/selected to include polypropylene material. In other embodiments, the polymeric feed in sorted/selected to include both polyethylene and polypropylene material. In some embodiments, the feed can contain up to 5% polypropylene, small quantities of polystyrene, and trace quantities of undesirable additives, such as PVC, ash, grit, or other unknown particles.

In some embodiments, the material selected in Material Selection Stage 1 comprises recycled plastics. In other or the same embodiments, the material selected in Material Selection Stage 1 comprises recycled plastics and/or virgin plastics.

In some embodiments, the material selected in Material Selection Stage 1 is heated in an extruder and undergoes Pre-Filtration Process 3. In some embodiments, the extruder is used to increase the temperature and/or pressure of the incoming plastic and is used to control the flow rates of the plastic. In some embodiments, the extruder is complemented by or replaced entirely by pump/heater exchanger combination.

Pre-Filtration Process 3 can employ both screen changers and filter beds, along with other filtering techniques/devices to remove contaminants from and purify the heated material. The resulting filtered material is then moved into an optional Pre-Heat Stage 4 which brings the filtered material to a higher temperature before it enters Reaction Stage 5. Pre-Heat Stage 4 can employ, among other devices and techniques, static and/or dynamic mixers and heat exchangers such as internal fins and heat pipes.

Material in Reaction Stage 5 undergoes depolymerization. This depolymerization can be a purely thermal reaction and/or it can employ catalysts. Depending on the starting material and the desired end product, depolymerization might be used for a slight or extreme reduction of the molecular weight of the starting material. In some embodiments, the catalyst used is a zeolite or alumina supported system or a combination of the two. In some embodiments, the catalyst is [Fe—Cu—Mo—P]/$Al_2O_3$ prepared by binding a ferrous-copper complex to an alumina or zeolite support and reacting it with an acid comprising metals and non-metals.

Reaction Stage 5 can employ a variety of techniques/devices including, among other things, fixed beds, horizontal and/or vertical reactors, and/or static mixers. In some embodiments, Reaction Stage 5 employs multiple reactors and/or reactors divided into multiple sections.

After Reaction Stage 5, the depolymerized material enters optional Cooling Stage 6. Cooling Stage 6 can employ heat exchangers, along with other techniques/devices to bring the depolymerized material down to a workable temperature before it enters Purification Stage 7.

In some embodiments, cleaning/purification of the material via such methods such as nitrogen stripping occurs before Cooling Stage 6.

Purification Stage 7 involves the refinement and/or decontamination of the depolymerized material. Techniques/devices that can used in Purification Stage 7 include, but are not limited to, flash separation, absorbent beds, clay polishing, distillation, vacuum distillation and filtration to remove solvents, oils, color bodies, ash, inorganics, and coke. In some embodiments, a thin or wiped film evaporator is used to remove gas, oil, and/or grease from the depolymerized material. In some embodiments, the oil, gas and grease can in turn be burned to help run various Stages of Process 10.

Process 10 ends at Finished Wax Stage 8 in which the initial starting material selected in Material Selection Stage 1 has been turned into wax. In at least some embodiments, the wax at Finished Wax Stage 8 is commercially viable and does not need additional processing and/or refining.

Figure 2:
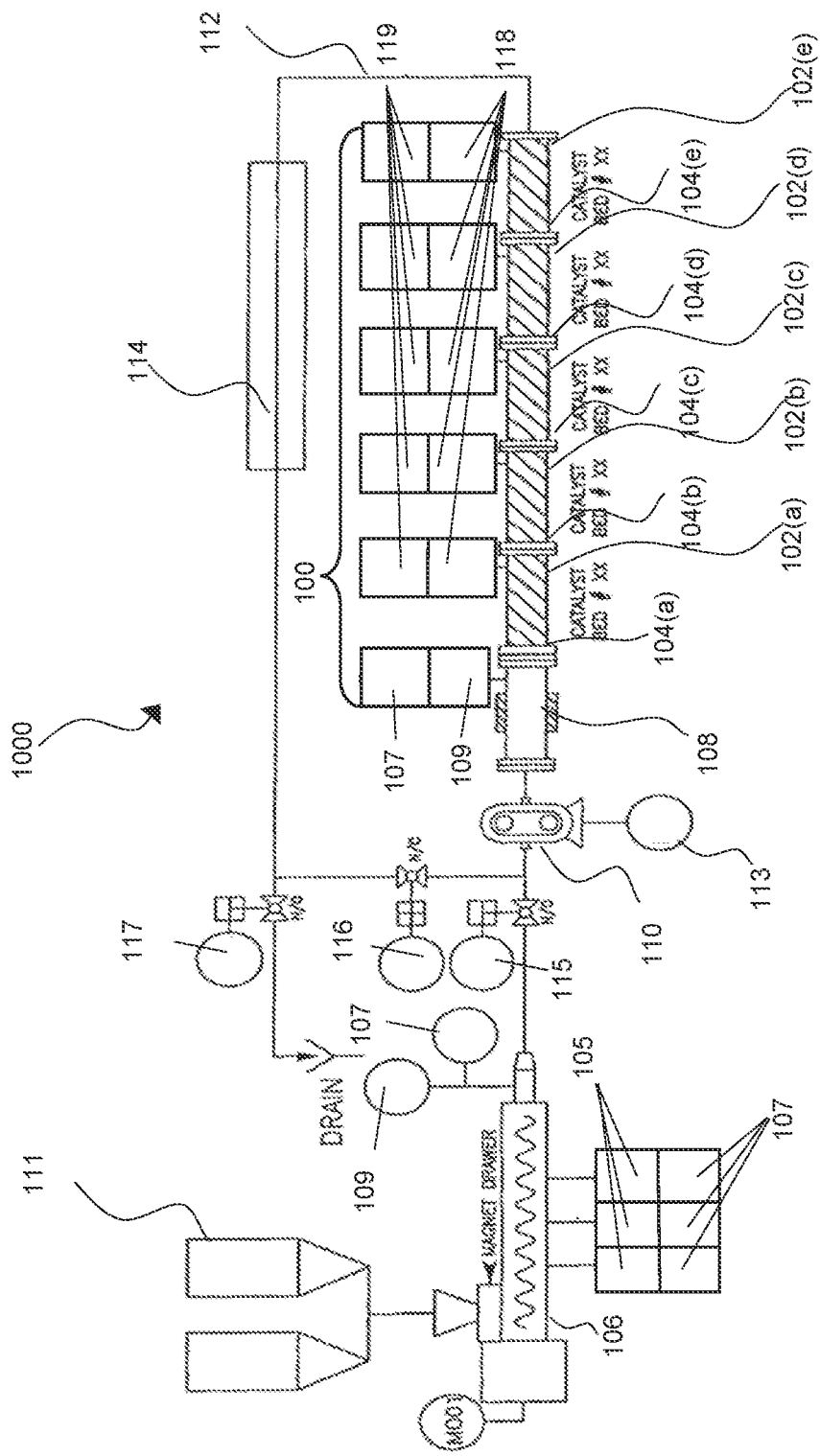
FIG. 2 is a schematic of a system including a reactor having a total of five reactor modules.
Figure 3:
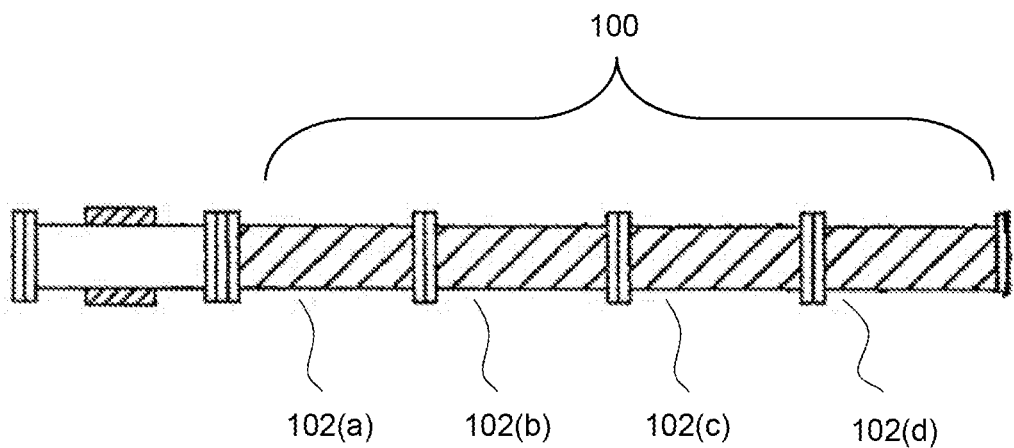
FIG. 3 is a schematic of the reactor illustrated in FIG. 2, with reactor modified by removing one reactor module such that the reactor has a total of four reactor modules.
Figure 4:
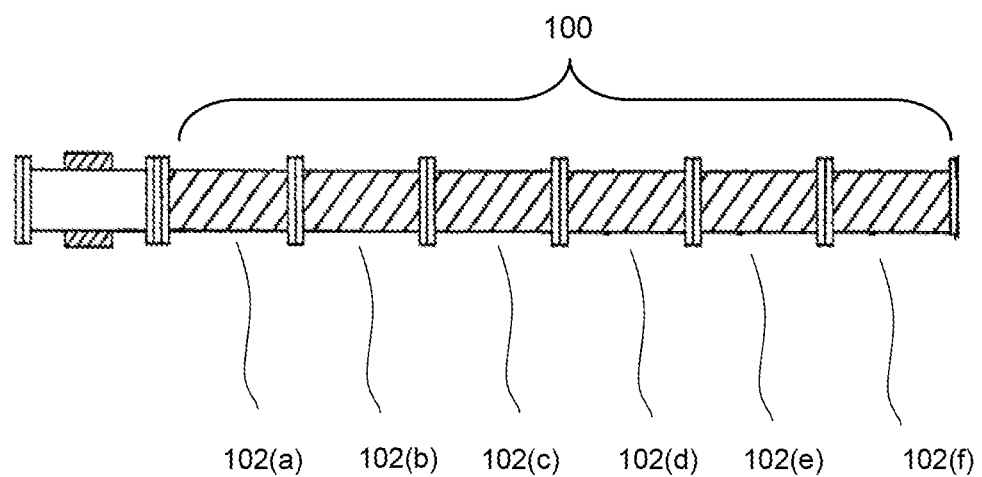
FIG. 4 is a schematic of the reactor illustrated in FIG. 2, with the reactor modified by adding one reactor module such that the reactor has a total of six reactor modules.

Referring to FIG. 2, system 1000 includes reactor 100 with five reactor modules 102(a) through 102(e). Reactor modules 102 can vary in dimensions and/or be connected in parallel and/or series. In other embodiments, various numbers of reactor modules 102 can be used. For example, FIG. 3 shows system 1000 with four reactor modules, 102(a) through 102(d) Similarly, FIG. 4 shows system 1000 with six reactor modules 102(a) through 102(f). The ability to customize the number of reactor modules 102 allows for greater control of the amount of depolymerization.

System 1000 can include hopper 111 for receiving polymeric material and/or directing the supply of the polymeric material to optional extruder 106. In some embodiments, extruder 106 processes the polymeric material received from hopper 111 by generating a molten polymeric material. The temperature of the polymeric material being processed by extruder 106 is controlled by modulating the level of shear and/or the heat being applied to the polymeric material by extruder heater(s) 105. Extruder heaters can use a variety of heat sources including, but not limited to, electric, thermal fluids, and/or combustion gases. The heat is modulated by a controller, in response to temperatures sensed by temperature sensor(s) 107.

In some embodiments, pressure sensor 109 measures the pressure of the molten polymeric material being discharged from extruder 106, to prevent, or at least reduce, risk of pressure spikes. The discharged molten polymeric material is pressurized by pump 110 to affect its flow through heating zone 108 and reactor 100. While flowing through reactor 100, the reactor-disposed molten polymeric material contacts a catalyst material which causes depolymerization.

Pressure sensor(s) 109 and/or temperature sensor(s) 107 can also be used to measure temperature and/or pressure, respectively, of the reactor-disposed molten polymeric material as it flows through reactor 100. Pressure sensor(s) 109 can monitor for plugs before and/or after each reaction zones. Pressure sensor(s) 109 can also maintain system pressure below a maximum pressure such as the maximum pressure of reactor 100 is designed for. Over-pressure can be controlled by feedback from pressure transmitter 109 to a controller which transmits a command signal to shut down extruder 106 and pump 110, and thereby prevent the pressure from further increasing.

In cases when shutdown of extruder 106 does not relieve the over pressure, dump valve 117 can be opened into a container to remove material from system 1000 and avoid an over pressure situation. During shutdown dump valve 117 can be opened to purge system 1000 with nitrogen to remove leftover material to avoid clogs and degraded material during the next start up.

System 1000 can also include a pressure relief device, such as a relief valve or a rupture disk, disposed at the outlet of extruder 106, to relieve pressure from system 1000, in case of over-pressure.

Temperature sensor(s) 107 can facilitate control of the temperature of the reactor-disposed molten polymeric material being flowed through reactor 100. This allows more precise control of the chemical reaction and the resulting polymerization. Temperature sensor(s) 107 also aid in maintaining the temperature below a predetermined maximum temperature, for example the maximum design temperature of reactor 100.

The temperature is controlled by a controller (not shown), which modulates the heat being applied by heaters 118 disposed in heat transfer communication with the reaction zones 102(a) through 102(e) of reactor 100, in response to the temperatures sensed by temperature sensor(s) 119.

Flow control can also be provided for within system 1000. In some embodiments, system 1000 includes valve 115, disposed at the discharge of extruder 106, for controlling flow from extruder 106 to other unit operations within system 1000. Valve 116 facilitates recirculation. Valve 117 enables collection of product.

During operation, valve 115 can be closed in order to recirculate the molten polymeric material and increase the temperature of the molten polymeric material to a desired temperature. In this case valve 116 would be open, valve 117 would be closed, extruder 106 would be "OFF", and pump 110 would be recirculating.

Generated molten product material 112 is cooled within heat exchanger 114, which can be, among other ways, water jacketed, air cooled, and/or cooled by a refrigerant. A fraction of the cooled generated molten product material can be recirculated (in which case valve 116 would be open), for reprocessing and/or for energy conservation.

In some embodiments, system 1000 is configured for purging by nitrogen to mitigate oxidation of the molten product material and the creation of explosive conditions.

Figure 5:
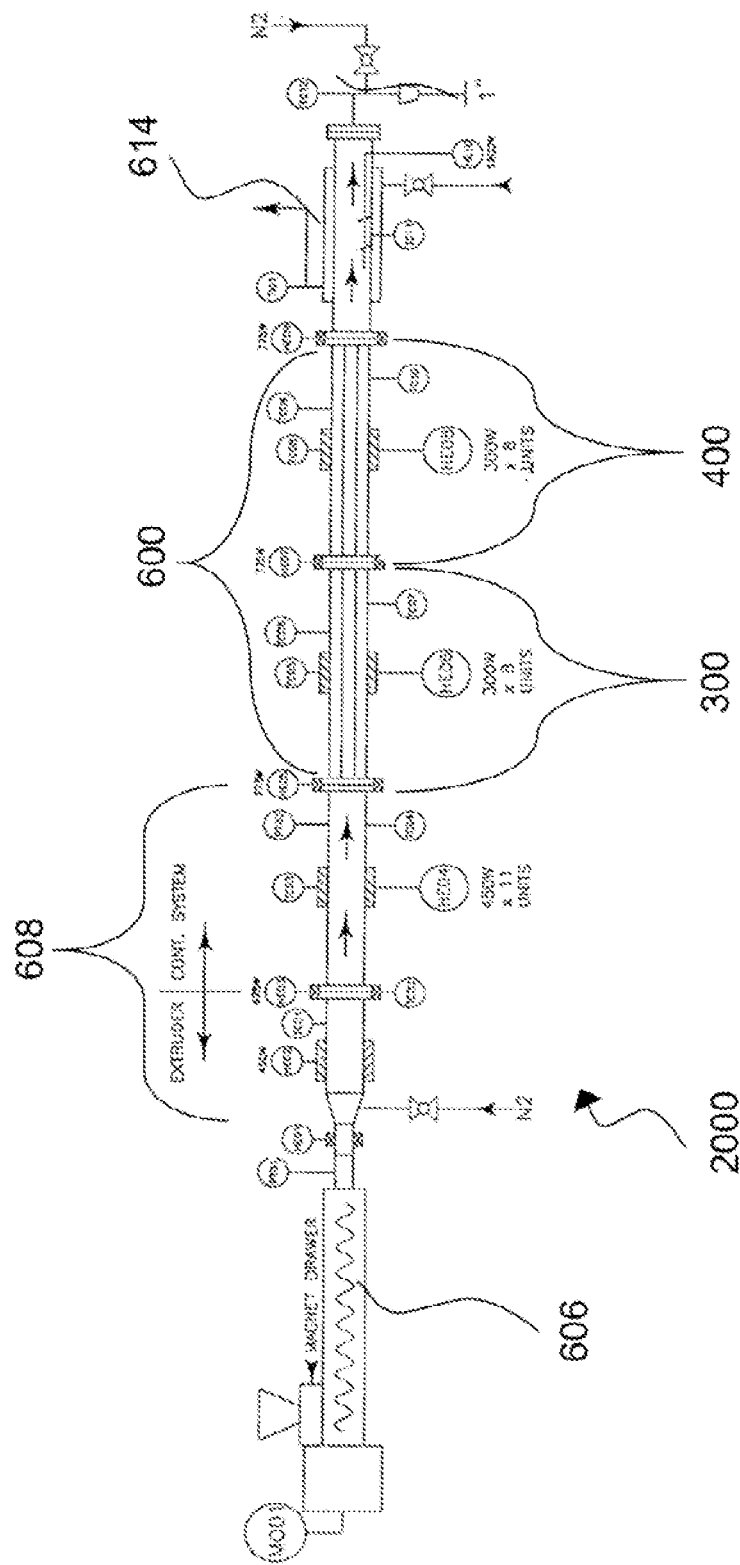
FIG. 5 is schematic of a system including a reactor with two reactor modules, namely an inlet reactor module and an outlet reactor module.

In another embodiment illustrated in FIG. 5, System 2000 includes reactor 600. Reactor 600 has two reactor modules, namely, inlet reactor module 300 and outlet reactor module 400. System 2000 also includes extruder 606 for receiving polymeric material. Extruder 606 processes polymeric material by generating a molten polymeric material. The temperature of the polymeric material being processed through reactor 600 is controlled by modulating the heat being applied to the polymeric material by process heaters HE01, HE02, HE04, HE06, HE08. Temperature sensors TC01, TC04, TC06, TC07 TC09, TC10, TC12 are provided to measure the temperature of the molten material within reactor 600. Temperature controllers TC03, TC05, TC08, TC11 are provided to monitor and control the temperature of process heaters HE01, HE02, HE04, HE06, and HE08. Flange heaters HE03, HE05, HE07, and HE09 are also provided to mitigate heat losses through the flanged connections.

The discharged molten polymeric feed material is conducted through heater 608 and reactor 600, in series. While flowing through reactor 600, the reactor-disposed molten polymeric material is contacted with the catalyst material to affect the depolymerization. The generated molten product material is cooled within heat exchanger 614, which can be, among other things, water jacketed, air cooled, or cooled by a refrigerant. In some embodiments, the waste heat from the cooling molten product can be used to run other processes. A cooling section heater HE10 is provided to melt wax that solidifies in cooling section.

In both System 1000 and System 2000 reactors 100 and 600 include one or more reactor modules. Each reactor modules includes a respective module reaction zone in which the reactor-disposed molten polymeric material is brought into contact with a catalyst material over a module-defined residence time, thereby causing depolymerization of the flowing reactor-disposed molten polymeric material. In some of these embodiments, the module-defined residence time of at least two of the reactor modules is the same or substantially the same. In some of these embodiments, as between at least some of the plurality of module-defined residence times are different. In some of these embodiments the catalyst material of at least two of the reactor modules are the same or substantially the same. In some of these embodiments the catalyst material of at least two of the reactor modules are different.

In some embodiments, each of the reactor modules includes a reactor-disposed molten polymeric material-permeable container that contains the catalyst material. The container is configured to receive molten polymeric material such that at least partial depolymerization of at least a fraction of the received molten polymeric material is effected by the catalyst material, and to discharge a molten product material that includes depolymerization reaction products (and can also include unreacted molten polymeric material and intermediate reaction products, or both). Flowing of the reactor-disposed molten polymeric material through the reactor-disposed molten polymeric material-permeable container effects contacting between the catalyst material and the reactor-disposed molten polymeric material, for effecting the at least partial depolymerization of at least a fraction of the reactor-disposed molten polymeric material. In this respect, the flowing reactor-disposed molten polymeric material permeates through the catalyst material within the container, and while permeating through the catalyst material, contacts the catalyst material contained within the container, for effecting the at least partial depolymerization of at least a fraction of the reactor-disposed molten polymeric material.

In both System 1000 and System 2000 a first reactor is assembled from the reactor modules. The first reactor has a first reaction zone and includes a total number of "P" reactor modules from "N" reactor modules, wherein "N" is a whole number that is greater than or equal to one.

Each one of the "N" reactor modules defines a respective module reaction zone including a catalyst material disposed therein, and is configured for conducting a flow of reactor-disposed molten polymeric material through the respective module reaction zone, such that, flowing of the reactor-disposed molten polymeric material through the respective module reaction zone brings it into contract with the catalyst material, thereby causing at least partial depolymerization of at least a fraction of the flowing reactor-disposed molten polymeric material. In this respect, the first reaction zone includes "P" module reaction zones.

When "N" is a whole number that is greater than or equal to two, each one of the "N" reactor modules is configured for connection, in series, to one or more of the other "N" reactor modules such that a plurality of reactor modules are connected to one another, in series, and includes a plurality of module reaction zones that are disposed in fluid communication within one another, in series, such that the total number of module reaction zones correspond to the total number of connected reactor modules. The plurality of connected reactor modules is configured for conducting a flow of reactor-disposed molten polymeric material through the plurality of module reaction zones, such that it comes into contact with the catalyst material, thereby effecting at least partial depolymerization of at least a fraction of the flowing reactor-disposed molten polymeric material.

When "P" is a whole number that is greater than or equal to two, the assembling of the first reactor includes connecting the "P" reactor modules to one another, in series, such that "P" reaction zones are disposed in fluid communication with one another in series.

In the embodiment illustrated in FIG. 2, "P" is equal to five, such that reactor 100 includes five reactor modules 102(*a*) through 102(*e*), the reaction zone consisting of five module reaction zones 104(*a*) through 104(*e*), each one respective to one of the five reactor modules. It is understood that "P" can be more or less than five.

In another embodiment illustrated in FIG. 5, "P" is equal to two, such that reactor 600 includes two reactor modules: inlet reactor module 300 and outlet reactor module 400.

Molten polymeric material, for supplying to the constructed reactor, is generated by heating a polymeric material. In some embodiments, the heating is caused by a heater. In FIG. 2 the heating is caused by a combination of extruder 106 and separate heater 108. In FIG. 5 the heating is caused by a combination of extruder 606 and separate heater 608. In such embodiments, the generated molten polymeric material is forced from the extruder, flowed through a separate heater, and then supplied to the module reaction zone. In some embodiments, the extruders are configured to supply sufficient heat to the polymeric material such that the generated molten polymeric material is at a sufficiently high temperature for supply to the reactor, and a separate heater is not required.

In FIG. 2, pump 110 receives molten polymeric material from extruder 106 and effects transport (or "flowing") of the molten polymeric material through heater 108, and then through the first reaction zone. In some embodiments, extruder 106 is configured to impart sufficient force to affect the desired flow of the generated molten polymeric material, such that pump 110 is optional. FIG. 5 shows an example without a pump.

In some embodiments, the molten polymeric material is derived from a polymeric material feed that is heated to effected generation of the molten polymeric material. In some embodiments, the polymeric material feed includes primary virgin granules of polyethylene. The virgin granules can include low density polyethylene (LDPE), linear low density polyethylene (LLDPE), high density polyethylene (HDPE), polypropylene (PP), or a mixture including combinations of LDPE, LLDPE, HDPE, and PP.

In some embodiments, the polymeric material feed includes waste polymeric material feed. Suitable waste polymeric material feeds include mixed polyethylene waste, mixed polypropylene waste, and a mixture including mixed polyethylene waste and mixed polypropylene waste. The mixed polyethylene waste can include low density polyethylene (LDPE), linear low density polyethylene (LLDPE), high density polyethylene (HDPE), polypropylene (PP), or a mixture including combinations of LDPE, LLDPE, HDPE, and PP. In some embodiments, the mixed polyethylene waste includes grocery bags, milk pouches, stationery files. In some embodiments, the waste polymeric material feed includes up to 10 weight % of material that is other than polymeric material, based on the total weight of the waste polymeric material feed.

The molten polymeric material is supplied to the reactor, and the molten polymeric material is flowed through the first reaction zone (that is, including the "P" reaction zones) as reactor-disposed molten polymeric material. The flowing of the reactor-disposed molten polymeric material through the first reaction zone brings it into contact with the catalyst material generating a molten product material, including a depolymerization product material (and, in some embodiments, also includes unreacted molten polymeric material and/or intermediate reaction products). The molten product material is collected.

In some embodiments, the catalyst material includes [Fe—Cu—Mo—P]/Al$_2$O$_3$. The catalyst is prepared by binding a ferrous-copper complex to an alumina support and reacting it with an acid comprising metals and non-metals to obtain the catalyst material. Other suitable catalyst materials include zeolite, mesoporous silica, H-mordenite and alumina. The system can also be run in the absence of a catalyst and produce waxes through thermal degradation.

The generated molten product material is discharged from and collected/recovered from the reactor. In some embodiments, the collection of the molten product material is effected by discharging a flow of the molten product material from the reactor. In those embodiments with a plurality of reactor modules, the molten product material is discharged from the first reactor module and supplied to the next reactor module in the series for effecting further depolymerization within the next reactor module in the series, and this continues as-between each adjacent pair of reactor modules in the series.

In some embodiments, the generated depolymerization product material includes waxes, greases, and grease-base stocks. Commercially available greases are generally made by mixing grease base stocks with small amounts of specific additives to provide them with desired physical properties. Generally, greases include four types: (a) admixture of mineral oils and solid lubricants; (b) blends of residuum (residual material that remains after the distillation of petroleum hydrocarbons), uncombined fats, rosin oils, and pitches; (c) soap thickened mineral oils; and (d) synthetic greases, such as poly-alpha olefins and silicones.

In some embodiments, the polymeric feed material is one of, or a combination of, virgin polyethylene (any one of, or combinations of, HDPE, LDPE, LLDPE, and MDPE), virgin polypropylene, or post-consumer, or post-industrial, polyethylene or polypropylene (exemplary sources including bags, jugs, bottles, pails, and the like), and it is desirable to convert such polymeric feed material into a higher melting point wax (having a melting point from 106 degrees Celsius to 135 degrees Celsius), a medium melting point wax (having melting point from 86 degrees Celsius to 105 degrees Celsius), a lower melting point wax (having a melting point from 65 degrees Celsius to 85 degrees Celsius), an even lower melting point wax (having a melting point from 40 degrees Celsius to 65 degrees Celsius) using an embodiment of the system disclosed herein. In each case, the conversion is effected by heating the polymeric feed material so as to generate molten polymeric material, and then contacting the molten polymeric material with the catalyst material within a reaction zone disposed at a temperature of between 325 degrees Celsius and 450 degrees Celsius. The quality of wax (higher, medium, or lower melting point wax) that is generated depends on the residence time of the molten polymeric material within the reaction zone. When operating in a continuous system depending on the flowrate of the extruder or gear pump residence times vary from 1-120 minutes, preferably 5-60 minutes, with 1-12 reactor modules attached in series. In some of these embodiments, the supply and heating of the polymeric feed material is effected by a combination of an extruder and a pump, wherein the material discharged from the extruder is supplied to the pump. In some of these embodiments, extruder 106 is a 10 HP, 1.5-inch (3.81 cm) Cincinnati Milacron Pedestal Extruder, Model Apex 1.5, and the pump 110 is sized at 1.5 HP for a 1.5-inch (3.81 cm) line.

In some embodiments, the polymeric feed material can consist of virgin crosslinked polyethylene. In some embodiments, the crosslinked polyethylene feed material is a blend of low density crosslinked polyethylene and high density crosslinked polyethylene.

Tests have concluded that crosslinked polyethylene can be used to produce various waxes when run through the depolymerization process. It is believed the virgin crosslinked polyethylene that was used in these tests was synthesised using a radical initiator (likely a peroxide).

Low density crosslinked polyethylene and high density crosslinked polyethylene are similar to their non-crosslinked precursors at least in the sense that they have a melting point from ~105 degrees Celsius to 130 degrees Celsius; and there are limits to what end products can be reached depending on which feed material is used. For example, starting with low density crosslinked polyethylene as a feed material does not allow one to produce Al$_2$O$_3$.

One unique outcome of using crosslinked polyethylene as a feed stock is the increase in a noticeable odor in the final product. It was discovered that these odors arise from a family of aromatics created during the crosslinking process, further the belief that the polyethylene was synthesized using a radical initiator.

Several techniques have been found to help reduce, if not eliminate, the odor from the end product. These techniques in order of their success, include aspiration and degassing with nitrogen (N$_2$).

It was also concluded that low density crosslinked polyethylene can successfully be combined with high density polyethylene as a feedstock to create wax. It should be noted that these blends do, at least initially, contain an odor.

A pressure transducer PT01 monitors for plugs within the extruder (as well as prior to PT02, see below) for maintaining system pressure below a maximum pressure (for example, maximum design pressure of the reactor 100). Likewise, pressure transducer PT02 monitors for plugs elsewhere within the system. Over-pressure is controlled by feedback from the pressure transmitted by PT01 and PT02 to a controller which transmits a command signal to shut down the extruder 106 and the pump 110, and thereby prevent the pressure from further increasing.

In some embodiments, reactor 100 is first reactor 100, and the reaction zone of the first reactor is a first reaction zone, and the flowing of the molten polymeric material, through the first reaction zone, is suspended (such as, for example, discontinued). After the suspending, the first reactor is modified When "P" is equal to one, the modifying includes connecting a total number of "R" of the "N–1" reactor modules, which have not been used in the assembly of the first reactor, to the first reactor, wherein "R" is a whole number from 1 to "N–1", such that another reactor is created and includes a total number of "R+1" reactor modules that are connected to one another, in series, and such that the another reactor includes a second reaction zone including "R+1" module reaction zones. The another reactor is configured to conduct a flow of molten polymeric material, such that flowing of the reactor-disposed molten polymeric material through the second reaction zone effects generation of another depolymerization product material and its discharge from the another reactor;

When "P" is a whole number that is greater than or equal to two, but less than or equal to "N–1", the modifying includes either one of:
(a) removing a total number of "Q" of the "P" reactor modules from the first reactor, wherein "Q" is a whole number from one to "P–1", such that another reactor is created and includes a total number of "P–Q" reactor modules that are connected to one another, in series, and such that the another reactor includes a second reaction zone including "P–Q" module reaction zones, wherein the another reactor is configured to conduct a flow of molten polymeric material, such that flowing of the reactor-disposed molten polymeric material through the second reaction zone effects of generation of another depolymerization product material and its discharge from the another reactor, or (b) connecting a total number of "R" of the "N–P" reactor modules, which have not been used in the assembly of the first reactor, to the first reactor, wherein "R" is a whole number from 1 to "N–P", such that another reactor is created and includes a total number of "P+R" reactor modules that are connected to one another, in series, and also includes a second reaction zone including "P+R" module reaction zones, wherein the another reactor is configured to conduct a flow of molten polymeric material, such that flowing of the reactor-disposed molten polymeric material through the second reaction zone effects generation of another depolymerization product material and its discharge from the another reactor;

When "P" is equal to "N", the modifying includes removing a total number of "Q" of the "P" reactor modules from the first reactor, wherein "Q" is a whole number from one to "P–1", such that another reactor is created and includes a total number of "P–Q" reactor modules that are connected to one another, in series, and such that the another reactor includes a second reaction zone, including "P–Q" module reaction zones. The another reactor is configured to conduct a flow of molten polymeric material, such that flowing of the reactor-disposed molten polymeric material through the second reaction zone effects generation of another depolymerization product material and its discharge from the another reactor.

In some embodiments, after the modifying of the first reactor to effect creation of another reactor (by either one of connecting/adding or removing reactor modules), another reactor is used to generate a second depolymerization product material. In this respect, polymeric material is heated to generate a molten polymeric material, and the molten polymeric material is flowed through the second reaction zone, to effect generation of a second depolymerization product material. The second depolymerization product material is then collected from the reactor.

In some embodiments, the same catalyst material is disposed within each one of the "N" reactor modules.

In some embodiments, the reaction zone of each one of the "N" reactor modules is the same or substantially the same.

Referring to FIGS. 6-14, in at least some embodiments, each reactor modules 200 includes pipe spool 201. In some embodiments, reactor module 200 includes pipe spool 201 with opposite first and second ends (only one is shown in the illustrated embodiment), with flanges 230 at each end, for facilitating connection with other reactor module(s) 200.

Reactor module 200 includes inlet 202A at a first end of the spool, outlet 202B at the opposite second end of the spool, and fluid passage 206 extending between inlet 202A and outlet 202B. Fluid passage 206 includes a catalyst material-containing space that is disposed within the reactor-disposed molten polymeric material-permeable container, with catalyst material 204 disposed within catalyst material-containing space 216. Catalyst material-containing space 216 defines module reaction zone 205 of reactor module 200.

Reactor module 200 is configured for receiving reactor-disposed molten polymeric material by inlet 202A and conducting the received molten polymeric material through fluid passage 206 such that it is brought into contact with catalyst material 204. This causes at least partial depolymerization of at least a fraction of the molten polymeric material such that molten product material, including depolymerization reaction products (and, in some embodiments, unreacted molten polymeric material and/or intermediate reaction products (such as partially depolymerized material)), are produced. Reactor module 200 then discharges the molten product material from outlet 202B.

Relatively unobstructed fluid passage portion 218 of fluid passage 206 extends between inlet 202A and outlet 202B, and is disposed in fluid communication with catalyst material-containing space 216 via a wire screen. Wire screen 208 is disposed within pipe spool 201, segmenting fluid passage 206 into relatively unobstructed fluid passage portion 218 and catalyst material comprising space 204. Wire screen 208 contains catalyst material 204 within catalyst material-containing space 216, and thereby defines molten polymeric material-permeable container 203.

Wire screen 208 is disposed in spaced apart relationship relative to fluid passage-defining internal wall 210 of pipe spool 201, and extends longitudinally through the length of pipe spool 201. The space between wire screen 208 and internal wall 210 defines relatively unobstructed fluid passage portion 218 of fluid passage 206. Fluid communication between fluid passage portion 218 and catalyst material-containing space 216 is made possible via spaces within wire screen 208. Thus wire screen 208 permits permeation of the molten polymeric material from relatively unobstructed fluid passage portion 218 to catalyst material-containing space 216 (and thereby facilitates contact of the molten polymeric material with catalyst material 204 within the reaction zone), and also from catalyst material-containing space 216 to relatively unobstructed fluid passage portion 218 (for discharging the molten product material including the depolymerization reaction products and unreacted molten polymeric material and/or intermediate reaction products), while preventing, or substantially preventing, egress of catalyst material 204 from catalyst material-containing space 216 to relatively unobstructed fluid passage portion 218.

In some embodiments, pipe spool 201 is cylindrical, and wire screen 208 is also cylindrical and is nested within pipe spool 201, such that relatively unobstructed fluid passage portion 218 is defined within the annular space between internal wall 210 of pipe spool 201 and wire screen 208, and catalyst material-containing space 216 is disposed within wire screen 208. In these embodiments, the catalyst material-containing fluid passage portion 216 is radially spaced outwardly, relative to relatively unobstructed fluid passage portion 218, from the axis of pipe spool 201.

In some embodiments, spacer tube 214 extends through the space defined by wire screen 208 and encourages flow of the reactor-disposed molten polymeric material to the portions of pipe spool 201 that are in close disposition to a heat transfer element (see below). This embodiment helps maintain the reactor-disposed molten polymeric material at a desired temperature. Also, by occupying space, spacer tube 214 effectively reduces the volume of module reaction zone 205, thereby increasing the velocity of the flowing reactor-disposed molten polymeric material.

In some embodiments, spacer tube 214 extends longitudinally through the length of pipe spool 201. In some embodiments, catalyst material-containing space 216 is defined within the annular space between spacer tube 214 and wire screen 208.

Reactor-disposed molten polymeric material is received by inlet 202A at the first end of pipe spool 201, and, while traversing pipe spool 201, via fluid passage 206, to the opposite end, is conductible, across wire screen 208, between relatively unobstructed fluid passage portion 218 and catalyst material-containing space 216. This produces a molten product material, including depolymerization reaction products (and, in some embodiments, unreacted molten polymeric material and/or intermediate reaction products), that is discharged via outlet 202B at the opposite second end of pipe spool 201. While being conducted through catalyst-material containing space 216, the reactor-disposed molten polymeric material is brought into contact with catalyst material 204 causing at least partial depolymerization of at least a fraction of the reactor-disposed molten polymeric material.

Figure 6:
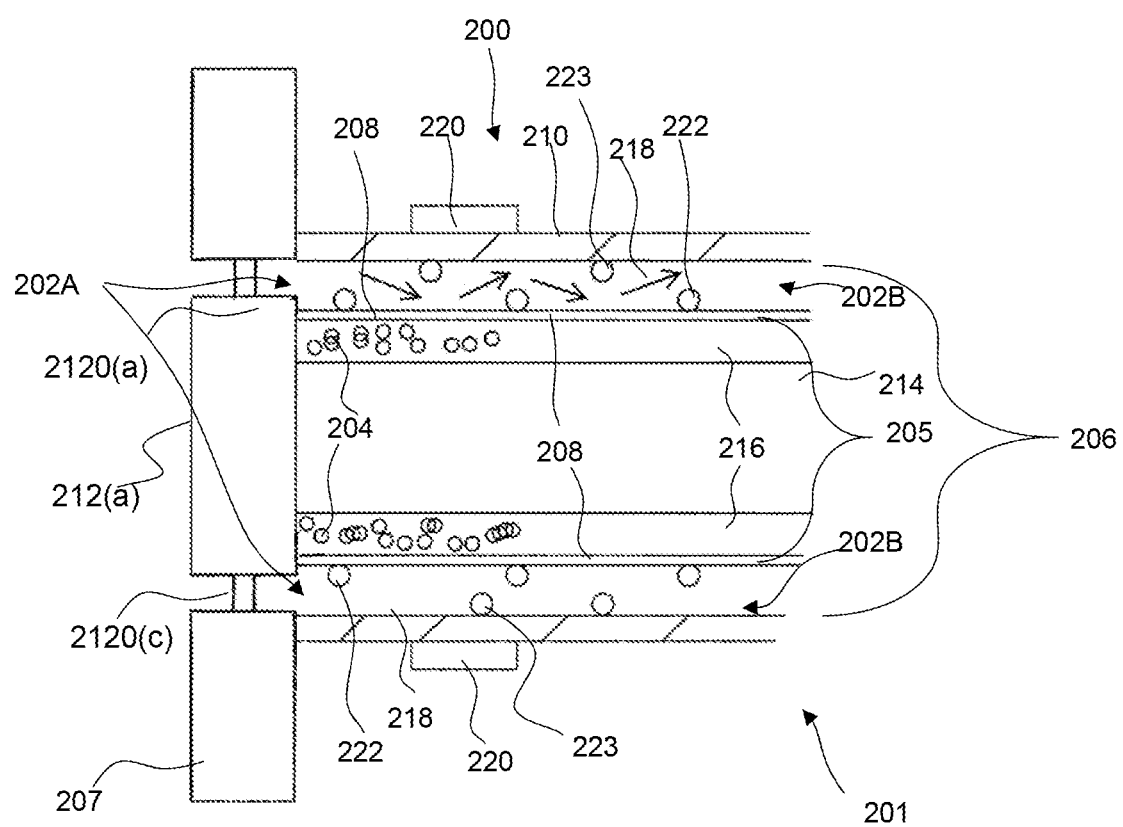
FIG. 6 is a cross-section side elevation view of a reactor module, with some of the catalyst material removed for clarity.
Figure 7:
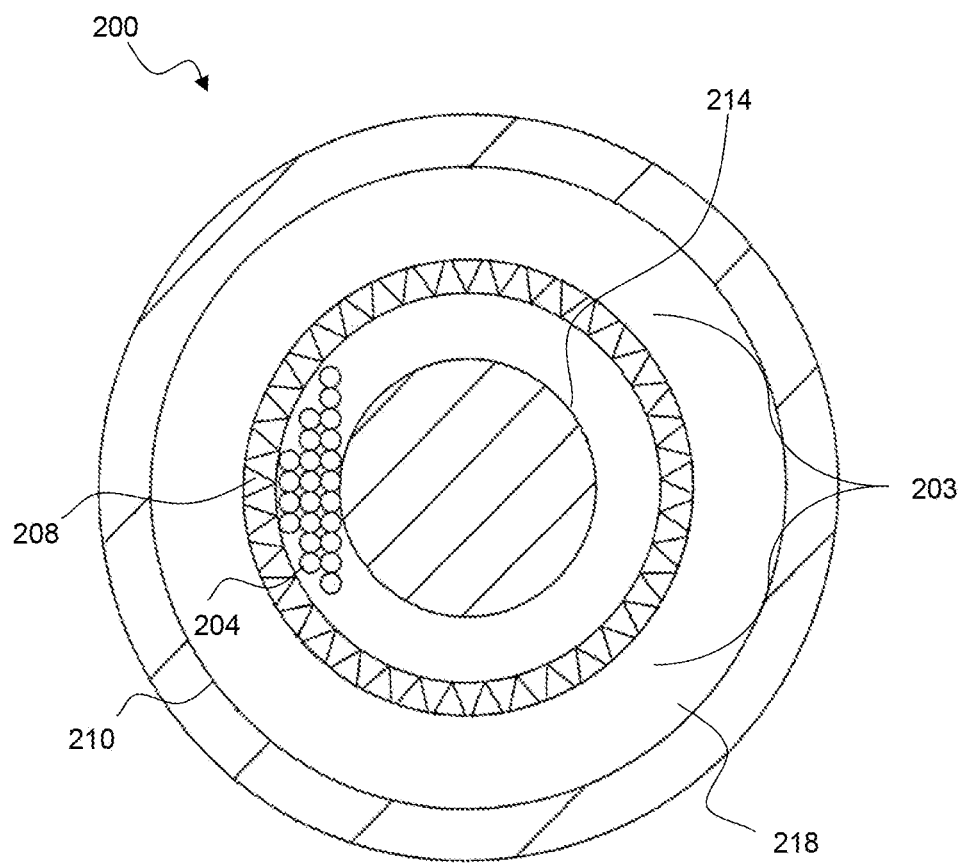
FIG. 7 is a cross-section elevation view from one end of the reactor module of FIG. 6, with the baffles and some of the catalyst material removed for clarity.
Figure 8:
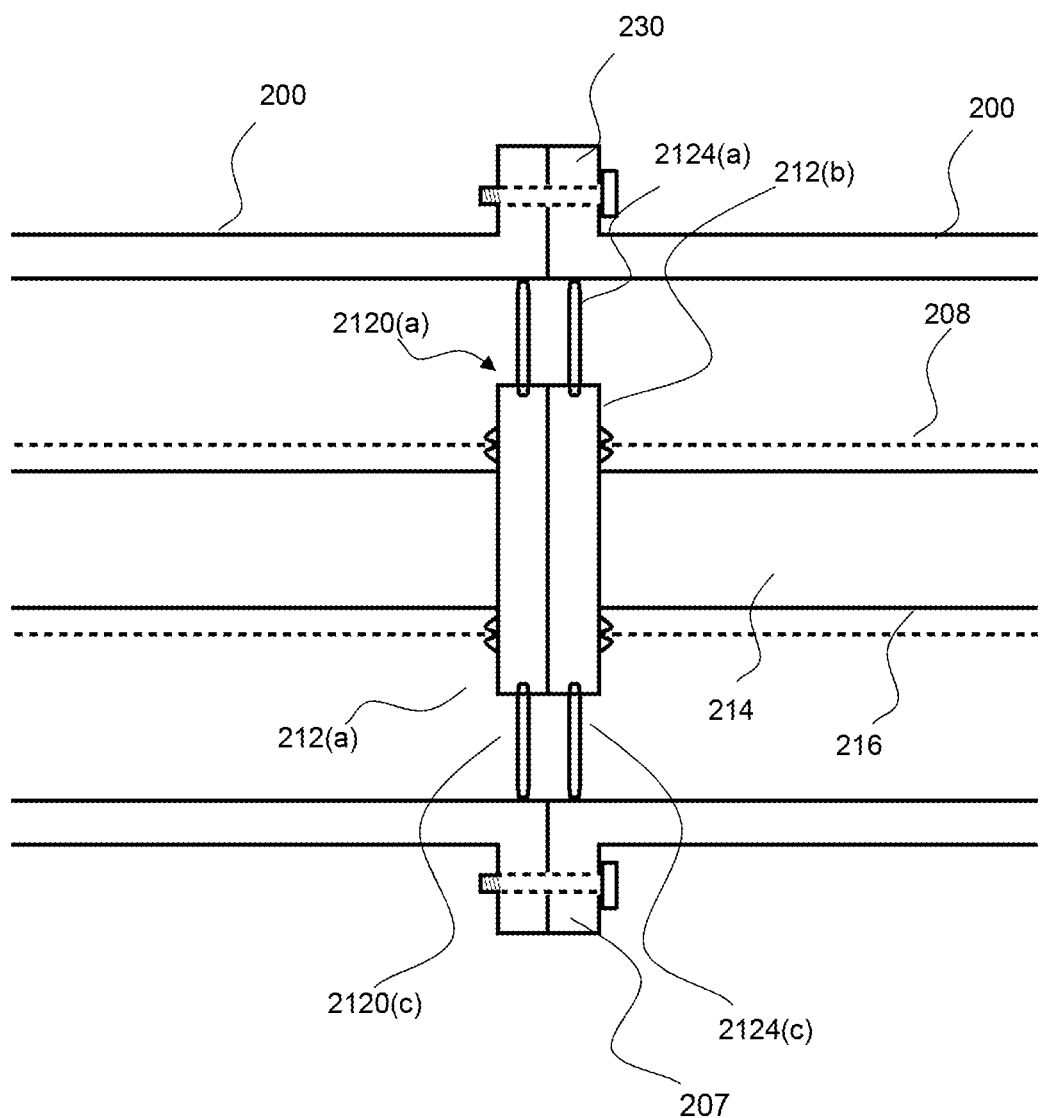
FIG. 8 is a cross-section side elevation view of connected reactor modules, with the baffles and the catalyst material removed for clarity.
Figure 14:
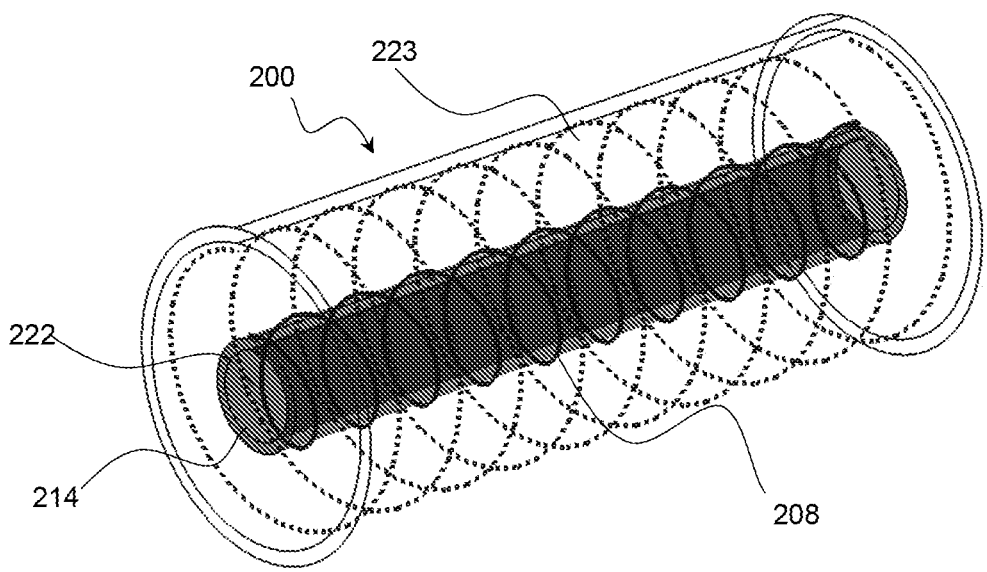
FIG. 14 is a partial cross-section perspective view of a pipe spool, baffles, wire screen, and spacer tube of a reactor module.
Figure 15:
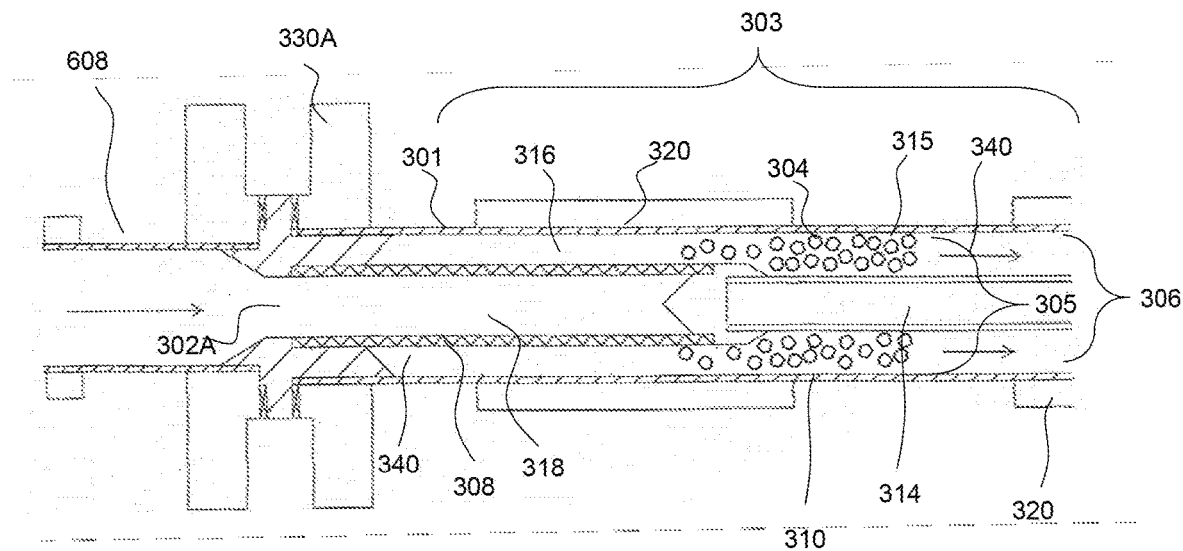
FIG. 15 is a schematic illustration of an upstream portion of an inlet reactor module, with the inlet reactor module being shown connected to the heater of the system.

Referring to FIGS. 6 and 14, in some embodiments, baffles 222, 223 are disposed within relatively unobstructed fluid passage portion 218. In some embodiments, baffle 222 is welded to end cap 212(a) and is in the form of a resilient wire that is wrapped about wire screen 208. In some embodiments, baffle 223 is in the form of a resilient wire that is pressed through the space between pipe spool 201 and wire screen 208, welded to end cap 212(a), and biased against interior wall 210 of spool 201.

Baffles 222, 223 encourage mixing of the flowing reactor-disposed molten polymeric material and promote uniform distribution of heat and mitigate charring of the reactor-disposed molten polymeric material, which could result in depositing of solid organic material on the structures defining fluid passage 206 and contribute to fouling. Baffles 222, 223 also encourages flow of reactor-disposed molten polymeric material from the relatively unobstructed fluid passage portion 218 towards catalyst material-containing space 216 and increase contact between the reactor-disposed molten polymeric material and catalyst material 204.

Referring to FIGS. 9-13, end cap assembly 211 is provided, and mounted within the interior space of pipe spool 201. End cap assembly 211 includes rigid end caps 212(a) and 212(b), wire screen 208, and spacer tube 214. End cap 212(a) is disposed proximate to one end of pipe spool 201, and end cap 212(b) is disposed proximate to an opposite end of pipe spool 201. In some embodiments, end caps 212(a), and 212(b) are also permeable to flow of reactor-disposed molten polymeric material.

Wire screen 208 is disposed between end caps 212(a) and 212(b), and its axial positioning within pipe spool 201, relative to pipe spool 201, is determined by end caps 212(a) and 212(b). One end of wire screen 208 is welded to end cap 212(a), while the opposite end of wire screen 208 is disposed within a recess formed in end cap 212(b), such that catalyst material-containing space 216, within which catalyst material 204 is contained, is defined within the space bounded by wire screen 208 and end caps 212(a) and 212(b).

Spacer tube 214 is disposed between end caps 212(a) and 212(b). One end of spacer tube 214 is welded to end cap 212(a), while the opposite end of spacer tube 214 is disposed within a recess formed in end cap 212(b).

Figure 11:
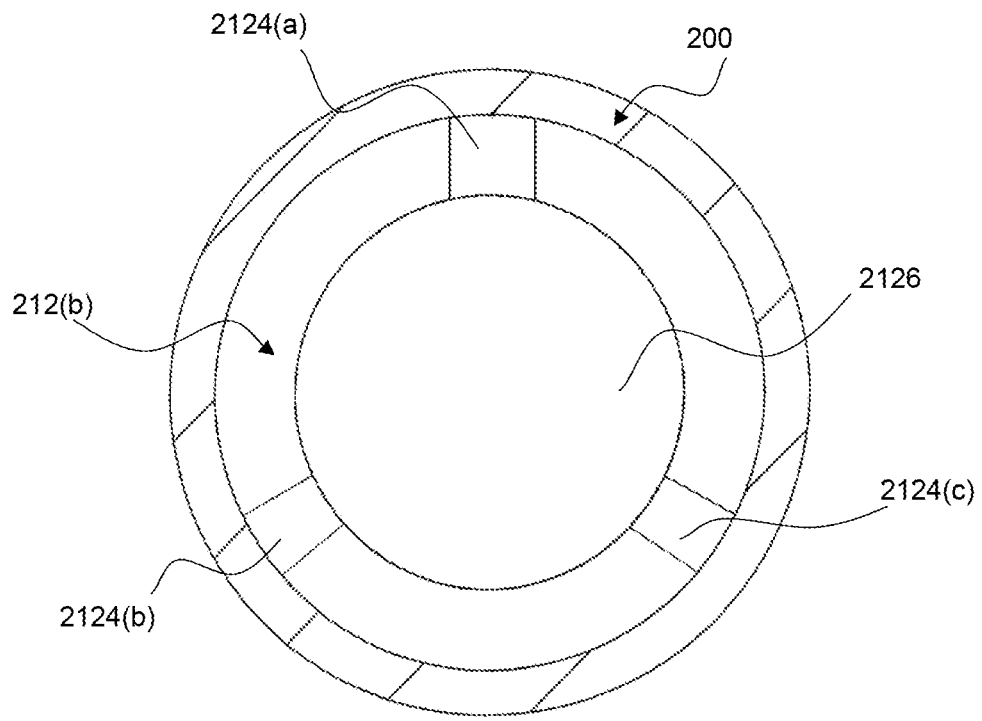
FIG. 11 is a cross-section front-elevation view of the end of the end cap assembly of FIG. 9, installed within a pipe spool of a reactor module.
Figure 12:
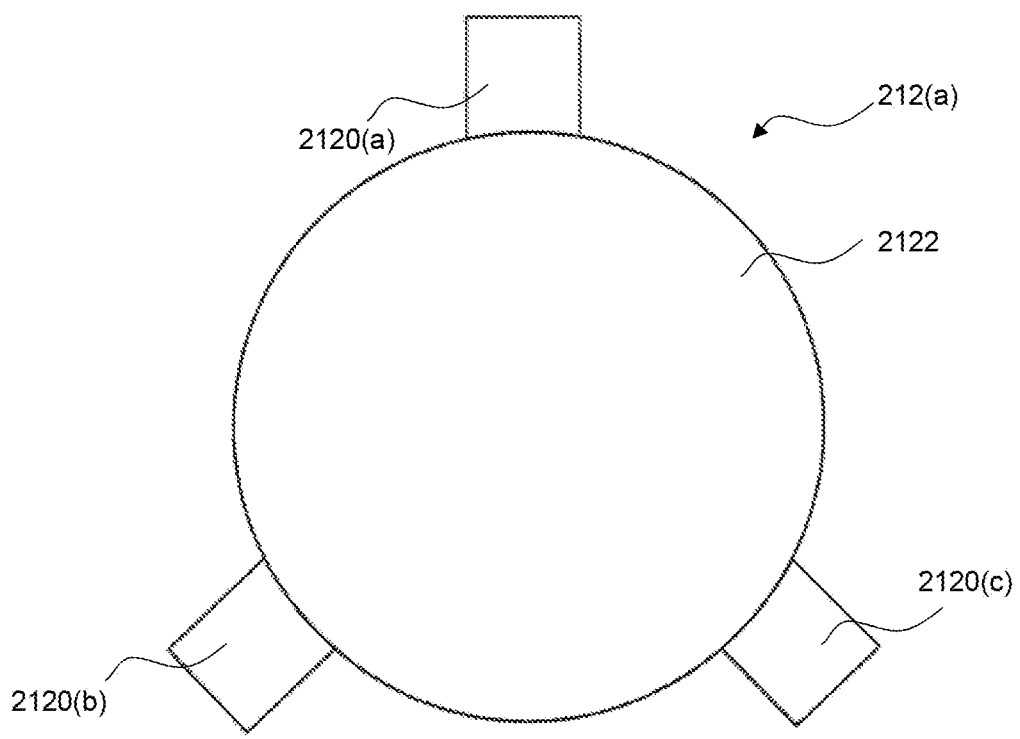
FIG. 12 is a front-elevation view of an end of an end cap assembly of a reactor module that is opposite to the end illustrated in FIG. 9.
Figure 13:
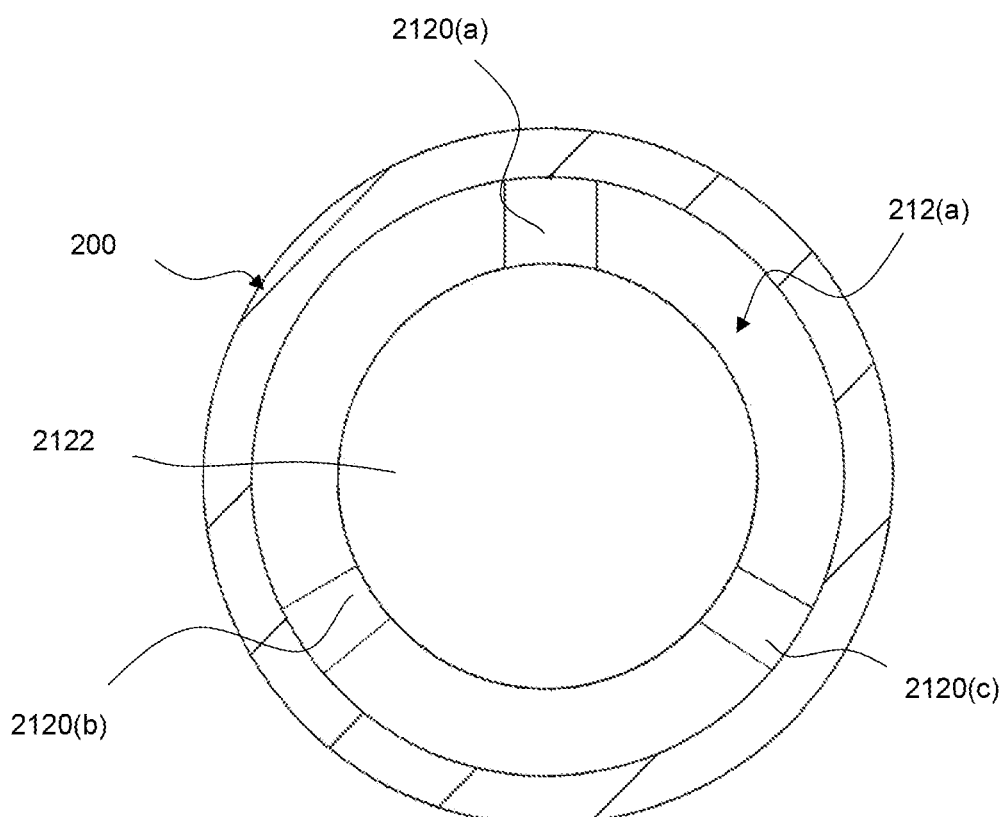
FIG. 13 is a cross-section front-elevation view of the end of the end cap assembly illustrated in FIG. 12, installed within a pipe spool of a reactor module.

Referring to FIGS. 11 and 12, end cap 212(a) is welded to pipe spool 201, for effecting connection of end cap assembly 211 to pipe spool 201. In this respect, end cap 212(a) includes a plurality of rigid end cap spacers 2120(a) to (c), projecting radially outwardly from end cap integrator 2122 (to which wire screen 208 and spacer tube 214 are welded). End cap spacers 2120(a) to (c) are received within corresponding recess provided within end cap integrator 2122. End cap spacers 2120(a) to (c) are spaced-apart from one another such that fluid communication allowed between reactor modules 200 that are connected to one another, and, specifically between reaction zones of connected reactor modules 200. End cap spacers 2120(a) to (c) can be welded to the interior of pipe spool 201, thereby determining the position of end cap 212(a) relative to pipe spool 201, and also determining the axial position of spacer tube 214 relative to pipe spool 201 (which is welded to end cap 212(a)).

Figure 9:
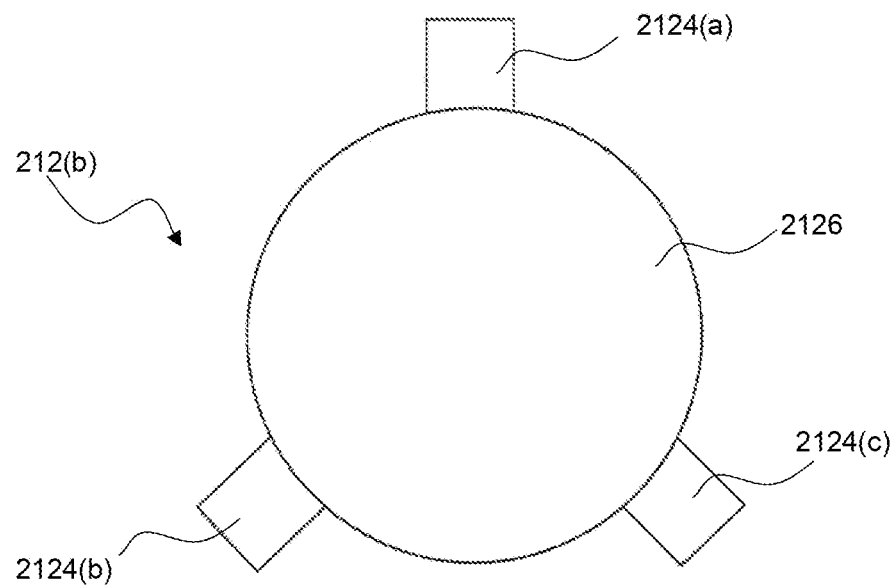
FIG. 9 is a front elevation view of one end of an end cap assembly of a reactor module.
Figure 10:
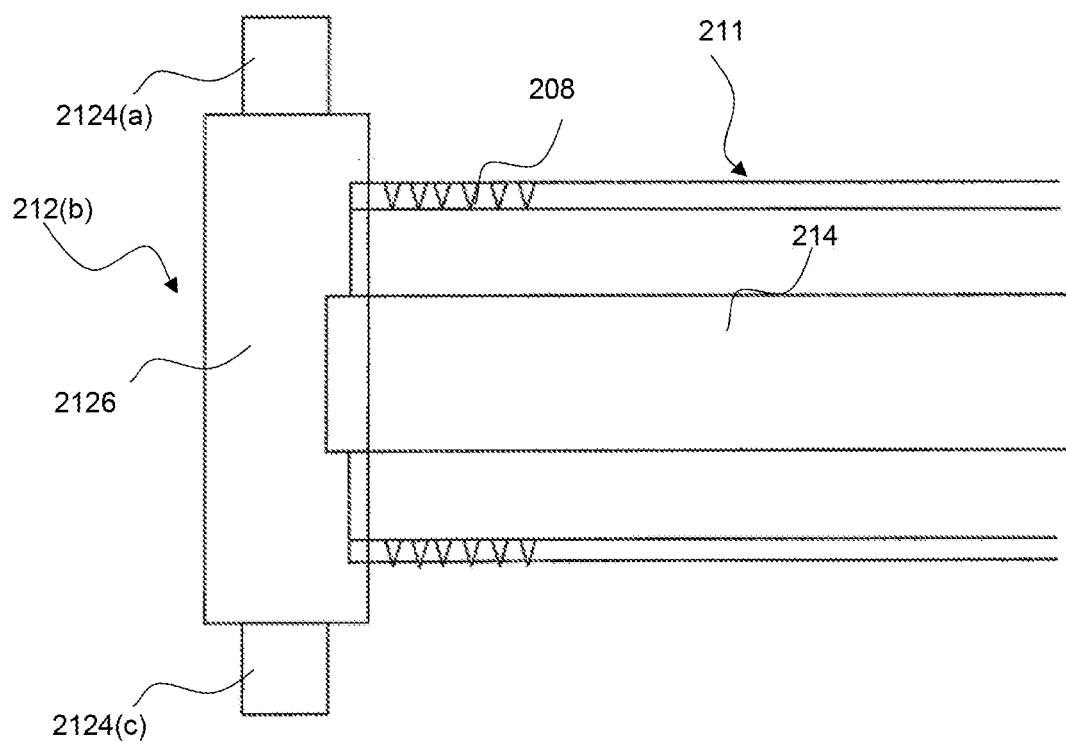
FIG. 10 is a cross-section side elevation view of the end of the end cap assembly illustrated in FIG. 9.

Referring to FIGS. 9 to 11, positioning of end cap 212(b) relative to pipe spool 201 is determined by disposing of end cap 212(b) in contact engagement with pipe spool 201, spacer tube 214 and by an adjacent piping structure, such as welded end cap 212(a) of another reactor module 200, or a conduit. Each one of spacer tube 214, and the adjacent piping structure are relatively rigid structures, such that the substantially fixed axial positioning of each one of spacer tube 214 and the adjacent piping structure, relative to pipe spool 201, determines the axial positioning of end cap 212(b) relative to pipe spool 201. When reactor module 200 is assembled, end cap 212(b) is pressed between spacer tube 214 and the adjacent piping structure (in the embodiment illustrated in FIG. 8, the adjacent piping structure is end cap 212(b) of another reactor module 200), such that axial positioning of end cap 212(b), relative to pipe spool 201 (and, therefore, end cap 212(a)) is determined by spacer tube 214 and the adjacent piping structure.

End cap 212(b) also includes rigid end cap spacers 2124(a) to (c), disposed within corresponding recesses within an end cap integrator 2126. The end cap integrator includes recesses which receive spacer tube 214 and wire screen 208. End cap spacers 2124(a) to (c) are disposed in contact engagement with the interior wall of pipe spool 201. End cap spacers 2124(a) to (c) project radially outwardly from end cap integrator 2126. End cap spacers 2124(a) to (c) are spaced apart from one another such that fluid can flow between reactor modules 200 that are connected to one another, and, specifically between reaction zones of connected reactor modules 200. When disposed in contact engagement with the interior wall of pipe spool 201, and in co-operation with spacer tube 214 and the adjacent piping structure, end cap spacers 2124(a) to (c) function to substantially fix vertical positioning of end cap 212(b) relative to pipe spool 201.

By configuring end cap 212(b) such that end cap 212(b) is removable from end cap assembly 211, repairs and maintenance within the reaction zone including the replacement of catalyst material 204, is made easier.

Heaters 220 are disposed in heat transfer communication with fluid passage 206 so as to effect heating of the reactor-disposed molten polymeric material that is flowing through fluid passage 206. Maintaining the flowing reactor-disposed molten polymeric material at a sufficient temperature leads to at least partial depolymerization. In some embodiments, heaters 220 include electric heating bands that are mounted to the external wall of pipe spool 201 and are configured to supply heat to fluid passage 206 by heat transfer through pipe spool 201.

Figure 16:
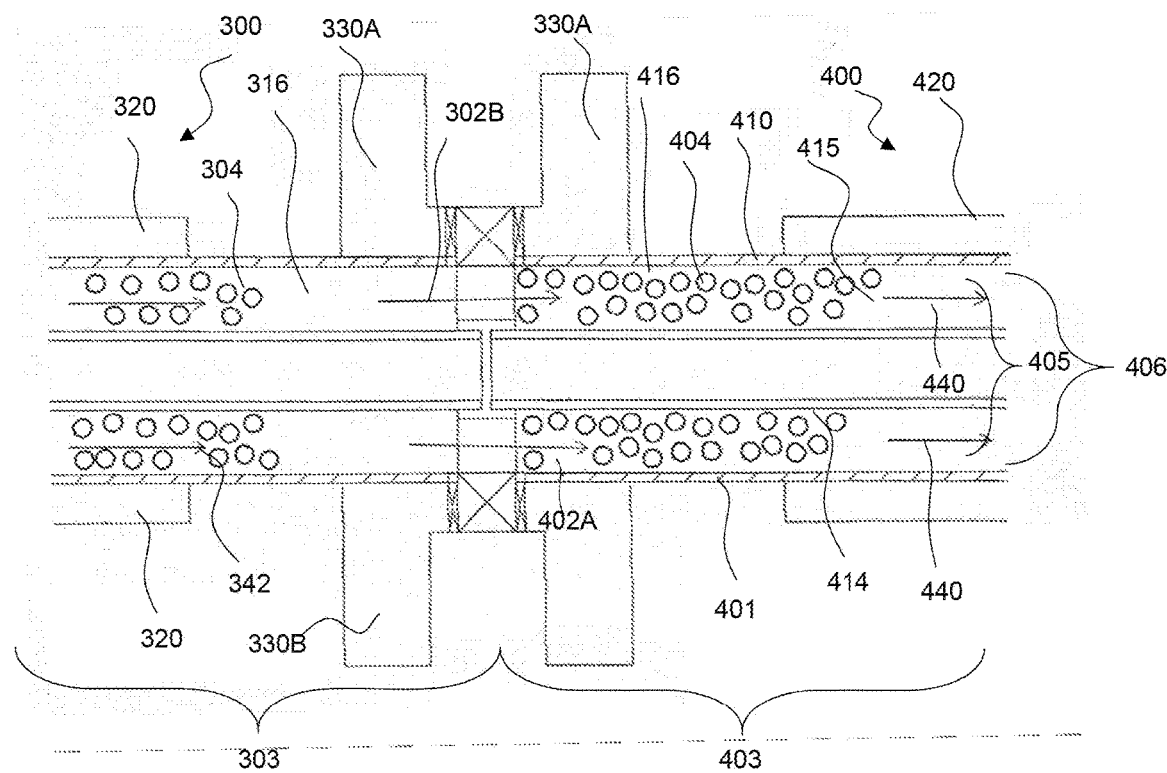
FIG. 16 is a schematic illustration of an downstream portion of the inlet reactor module, illustrated in FIG. 15, connected to an upstream portion of an outlet reactor module of the reactor.
Figure 17:
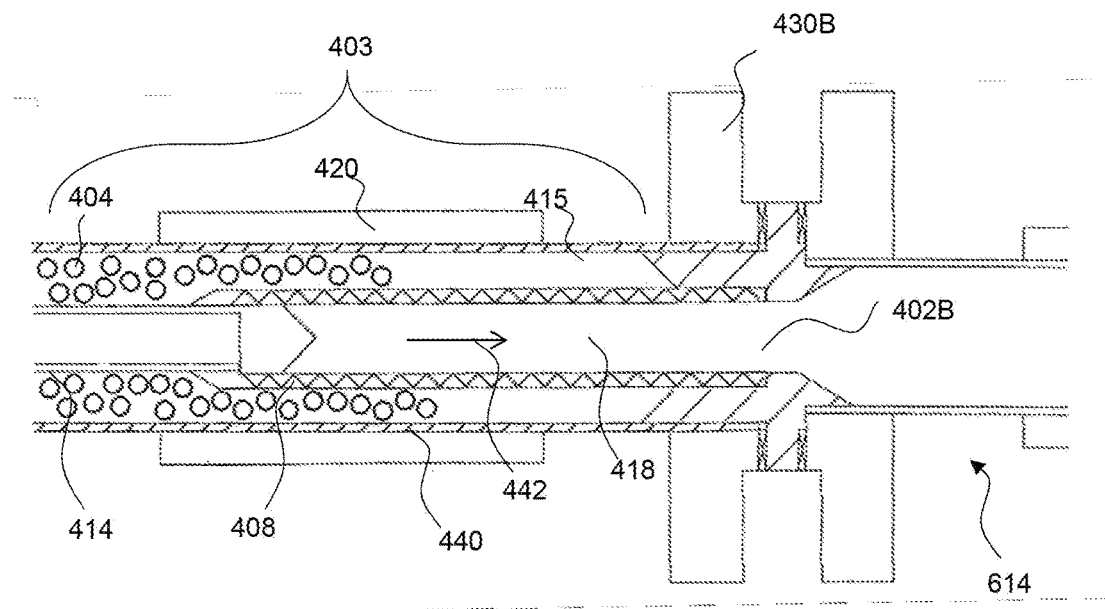
FIG. 17 is a schematic illustration of a downstream portion of the outlet reactor module, illustrated in FIG. 16, connected to the heat exchanger of the system (for cooling of the molten product material).
Figure 18:
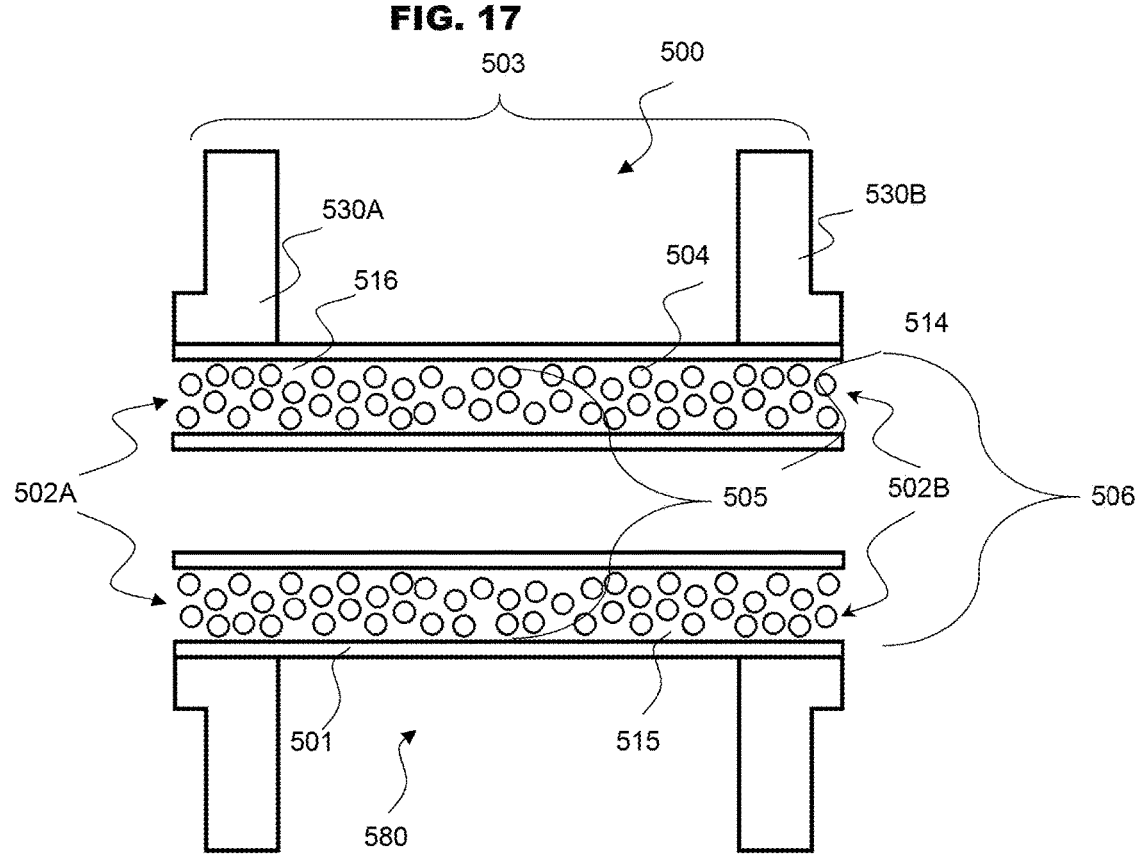
FIG. 18 is a schematic illustration of an intermediate reaction module that is integrateable within the reactor of the system illustrated in FIG. 16.

Referring to FIGS. 16 to 18, in some embodiments, reactor includes inlet reactor module 300, outlet reactor module 400, and, optionally, one or more intermediate reactor modules 500.

In some embodiments, inlet reactor module 300 includes pipe spool 301, having opposite ends, with respective flange 330A, 330B provided at each one of the opposite ends, for facilitating connection with an outlet reactor module 400, and, in some embodiments, an intermediate reactor module 500.

Inlet reactor module 300 includes inlet 302A at a first end of pipe spool 301, outlet 302B at the opposite second end of the spool, and fluid passage 306 extending between inlet 302A and outlet 302B. Fluid passage 306 includes catalyst material-containing space 316 that is disposed within reactor-disposed molten polymeric material-permeable container 303, with catalyst material 304 disposed within catalyst material-containing space 316. Catalyst material-containing space 316 defines module reaction zone 305 of reactor module 300.

Inlet reactor module 300 is configured for receiving reactor-disposed molten polymeric material by inlet 302A, conducting the received molten polymeric material through fluid passage 306, and while such conducting is being effected, contacting the molten polymeric material being conducted with catalyst material 304 such that at least partial depolymerization of at least a fraction of the molten polymeric material is effected and such that a molten product material is produced that includes depolymerization reaction products (and, in some embodiments, includes unreacted molten polymeric material and intermediate reaction products, or both), and discharging the molten product material from outlet 302B.

Fluid passage 306 includes relatively unobstructed fluid passage portion 318 and catalyst material-containing fluid passage portion 315 that includes catalyst material-containing space 316. Relatively unobstructed fluid passage portion 318 extends form inlet 302A, and is disposed in fluid communication with catalyst material-containing fluid passage portion 315 via wire screen 308. Catalyst material-containing fluid passage portion 315 extends into outlet 302B.

Wire screen 308 is disposed within pipe spool 301, segmenting fluid passage 306 into relatively unobstructed fluid passage portion 318 and catalyst material-containing fluid passage portion 316. Wire screen 308 is mounted at one end to, and extends from, the first end of pipe spool 301 and, in some embodiments, is mounted at an opposite end to spacer tube 314 (see below). Wire screen 308 contains catalyst material 304 within catalyst material-containing space 316. Wire screen 308 is disposed in spaced apart relationship relative to fluid passage-defining internal wall 310 of pipe spool 301, and extends longitudinally through a portion of pipe spool 301. The space between wire screen 308 and internal wall 310 defines a portion of catalyst material-containing fluid passage portion 315 and extends longitudinally across a portion of pipe spool 301 to define a portion of catalyst material-containing space 316. In this respect, the relatively unobstructed fluid passage portion 318 extends longitudinally along, or proximate to, an axis of pipe spool 301.

In some embodiments, wire screen 308 is cylindrical in shape, and is nested within pipe spool 301. In this respect, in some embodiments, catalyst material-containing fluid passage portion 315 is radially spaced outwardly, relative to relatively unobstructed fluid passage portion 318, from the axis of pipe spool 301.

Fluid communication between relatively unobstructed fluid passage portion 318 and catalyst material-containing fluid passage portion 315 is effected via spaces within the wire screen. In this respect, wire screen 308 is configured to permit permeation of the molten polymeric material from relatively unobstructed fluid passage portion 318 to catalyst material-containing fluid passage portion 315 (and thereby facilitate contact of the molten polymeric material with catalyst material 304 within the reaction zone), while preventing, or substantially preventing, egress of catalyst material 304 from catalyst material-containing space 316 to relatively unobstructed fluid passage portion 318.

In some embodiments, at a downstream end of relatively unobstructed fluid passage portion 318, an end wall is tapered to encourage flow of the molten polymeric material towards the catalyst-material containing space via wire screen 308, thereby mitigating pooling of the molten polymeric material.

The catalyst material-containing fluid passage portion 315 extends into an annular space defined between spacer tube 314, that is mounted within pipe spool 301, and internal wall 310 of pipe spool 301. By occupying this space, spacer tube 314 encourages flow of the reactor-disposed molten polymeric material within catalyst material-containing fluid passage portion 315 to the portions of pipe spool 301 that are in close disposition to a heat transfer element, and thereby maintaining the reactor-disposed molten polymeric material at a desired temperature. Also, by occupying space, spacer tube 314 effectively reduces the volume of module reaction zone 305, thereby increasing the velocity of the flowing reactor-disposed molten polymeric material.

Reactor-disposed molten polymeric material is received within relatively unobstructed fluid passage portion 318 via inlet 302A at the first end of pipe spool 301, and conducted across wire screen 308 to catalyst material-containing space 316 of catalyst material-containing fluid passage portion 315 (see directional arrows 340). While being conducted through catalyst material-containing fluid passage portion 315 (see directional arrows 342), the molten polymeric material becomes contacted with catalyst material 304 such that depolymerization reaction products are produced, and a molten product material, that includes depolymerization reaction products that are produced within catalyst material-containing fluid passage portion 315 (and, in some embodiments, also includes unreacted molten polymeric material and intermediate reaction products, or both), is then subsequently discharged via outlet 302B at the second opposite end of pipe spool 301.

In some embodiments, outlet reactor module 400 includes pipe spool 401, having opposite ends, with flanges provided at each one of the opposite ends, for facilitating connection with an inlet reactor module 300, and, in some embodiments, one an intermediate reactor module disposed between inlet and outlet reactor modules 300, 400.

The outlet reactor module 400 includes an inlet 402A at a first end of pipe spool 401, an outlet 402B at the opposite second end of the spool, and fluid passage 406 extending between inlet 402A and outlet 402B. Fluid passage 406 includes catalyst material-containing space 416 that is disposed within reactor-disposed molten polymeric material-permeable container 403, with catalyst material 404 disposed within catalyst material-containing space 416. Catalyst material-containing space 416 defines module reaction zone 405 of reactor module 400.

The outlet reactor module 400 is configured for receiving reactor-disposed molten polymeric material by inlet 402A, conducting the received molten polymeric material through fluid passage 406, and while such conducting is being effected, contacting the molten polymeric material being conducted with catalyst material 404 such that at least partial depolymerization of at least a fraction of the molten polymeric material is effected and such that a molten product material is produced that includes depolymerization reaction products (and, in some embodiments, also includes unreacted molten polymeric material and intermediate reaction products, or both), and discharging the molten product material from outlet 402B.

The fluid passage 406 includes catalyst material-containing fluid passage portion 415, that includes catalyst material-containing space 416, and a relatively unobstructed fluid passage portion 418. Catalyst material-containing fluid passage portion 415 extends from inlet 402A, and is disposed in fluid communication with the relatively unobstructed fluid passage portion 418 via wire screen 408. The relatively unobstructed fluid passage portion 418 extends into outlet 402B.

In some embodiments, spacer tube 414 is mounted within pipe spool 401 at a first end of pipe spool 401, such that the space (such as, for example, the annulus) between pipe spool 401 and spacer tube 414 defines a portion of catalyst material-containing fluid passage portion 415 that is extending from inlet 402A. By occupying this space, spacer tube 414 encourages flow of the reactor-disposed molten polymeric material within the catalyst material-containing fluid passage portion 415 to the portions of pipe spool 401 that are in close disposition to a heat transfer element (see below), and thereby maintaining the reactor-disposed molten polymeric material at a desired temperature. Also, by occupying space, spacer tube 414 effectively reduces the volume of module reaction zone 405, thereby increasing the velocity of the flowing reactor-disposed molten polymeric material.

The catalyst material-containing fluid passage portion 415 extends into an annular space defined between internal wall 410 of pipe spool 401 and wire screen 408. Wire screen 408 is disposed within pipe spool 401, segmenting fluid passage 406 into catalyst material-containing fluid passage portion 415 and the relatively unobstructed fluid passage portion 418. Wire screen 408 is mounted at one end to, and extends from, the second end of pipe spool 401 and is mounted at an opposite end to spacer tube 414. Wire screen 408 contains catalyst material 404 within catalyst material-containing space 416. Wire screen 408 is disposed in spaced apart relationship relative to fluid passage-defining internal wall 410 of pipe spool 401, and extends longitudinally through a portion of pipe spool 401. The space between wire screen 408 and internal wall 410 defines a portion of catalyst material-containing fluid passage portion 415. and extends longitudinally across a portion of pipe spool 401. In this respect, the relatively unobstructed fluid passage portion 418 extends longitudinally along, or proximate to, an axis of pipe spool 401, and into outlet 402B.

In some embodiments, wire screen 408 is cylindrical in shape, and is nested within pipe spool 401. In this respect, in some embodiments, catalyst material-containing fluid passage portion 415 is radially spaced outwardly, relative to the relatively unobstructed fluid passage portion 418, from the axis of pipe spool 401.

Fluid communication between catalyst material-containing fluid passage portion 415 and the relatively unobstructed fluid passage portion 418 is effected via spaces within the wire screen. In this respect, wire screen 408 is configured to permit permeation of the molten polymeric material from the relatively unobstructed fluid passage portion 418 to catalyst material-containing fluid passage portion 415 (and thereby facilitate the contacting of the molten polymeric material with catalyst material 404 within the reaction zone), while preventing, or substantially preventing, egress of catalyst material 404 from catalyst material-containing space 416 to the relatively unobstructed fluid passage portion 418.

Reactor-disposed molten polymeric material is received within catalyst material-containing fluid passage portion 415 via inlet 402A at the first end of pipe spool 401 (such as, for example, from outlet 302B of reactor module 300, or such as, for example, from the outlet of intermediate reactor module 500, see below), conducted through catalyst material-containing fluid passage portion 415 (see directional arrows 440). While being conducted through catalyst material-containing fluid passage portion 415, the molten polymeric material becomes contacted with catalyst material 404 such that a molten product material, that includes depolymerization reaction products (and, in some embodiments, also includes unreacted molten polymeric material and intermediate reaction products, or both), is produced. The molten product material, including the depolymerization products that are produced within catalyst material-containing fluid passage portion 415, are conducted across wire screen 408 to relatively unobstructed fluid passage portion 418 (see directional arrows 442) and subsequently discharged via outlet 402B at the second opposite end of pipe spool 401.

In some embodiments, the reactor includes one or more intermediate reactor modules 500 disposed between inlet and outlet reactor modules 300, 400.

In some embodiments, intermediate reactor module 500 includes pipe spool 501, having opposite ends, with flanges 530A, 530B provided at each one of the opposite ends, for facilitating connection with a reactor module. The flange at a first end is provided for facilitating connection with either one of inlet reactor module 300, or another intermediate reactor module 500. The flange at the second end is provided for facilitating connect with either one of outlet reactor module 400 or another intermediate reactor module 500.

Pipe spool 501 includes inlet 502A at a first end of pipe spool 501, outlet 502B at an opposite second end of pipe spool 501, and fluid passage 506 extending between inlet 502A and outlet 502B. Fluid passage 506 includes catalyst material-containing space 516. Catalyst material-containing space 516 is disposed within reactor-disposed molten polymeric material-permeable container 503, and catalyst material 504 is disposed within catalyst material-containing space 516. Catalyst material-containing space 516 defines module reaction zone 505 of reactor module 500.

Intermediate reactor module 500 is configured for receiving reactor-disposed molten polymeric material by inlet 502A, conducting the received molten polymeric material through fluid passage 506, and while such conducting is being effected, contacting the molten polymeric material being conducted with catalyst material 504 such that at least partial depolymerization of at least a fraction of the molten polymeric material is effected and such that a molten product material is produced that includes depolymerization reaction products (and, in some embodiments, also includes unreacted molten polymeric material and intermediate reaction products, or both), and discharging the molten product material from outlet 502B.

Fluid passage 506 includes catalyst material-containing fluid passage portion 515 that includes catalyst material-containing space 516.

In some embodiments, spacer tube 514 is mounted within pipe spool 501 at a first end of pipe spool 501, such that the space between pipe spool 501 and spacer tube 514 defines catalyst material-containing space 516. By occupying this space, the spacer tube encourages flow of the reactor-disposed molten polymeric material within catalyst material-containing fluid passage portion 515 to the portions of pipe spool 501 that are in close disposition to a heat transfer element (see below), and thereby maintaining the reactor-disposed molten polymeric material at a desired temperature. Also, by occupying space, spacer tube 514 effectively reduces the volume of module reaction zone 505, thereby increasing the velocity of the flowing reactor-disposed molten polymeric material.

Figure 19:
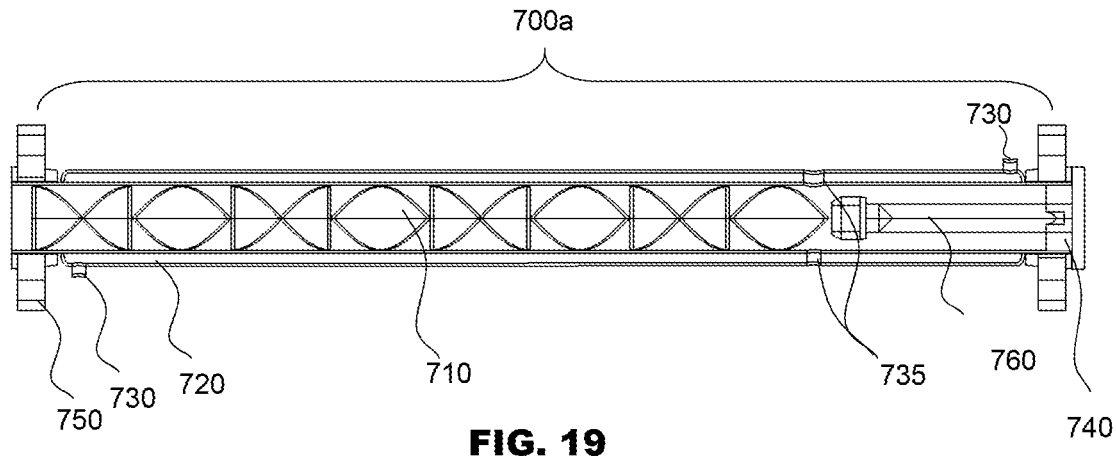
FIG. 19 is a cross-section side-elevation view of a catalytic reactor with a removable static mixer configured to be heated via thermal fluid/molten salt.

FIG. 19 shows a cross-section side-elevation view of catalytic reactor 700*a* with removable static mixer 710 configured to be heated via thermal fluid and/or molten salt. Static mixer 710 provides greater mixing in catalytic reactor 700*a* and can result in the need of a lower operating temperature. In some embodiments, static mixer 710 is removable which allows for easier cleaning and maintenance of reactor 700*a*. Removable static mixer 710 also allows for repurposing of reactor segments. For example, jacketed reactors can be converted to pre-heat or cooling segments.

Thermal fluid and/or molten salt can be heated, among other ways, by natural gas, electric, waste process heats, and coal. In some embodiments, thermal fluid and/or molten salt reduces the costs of having to use electric.

The tubular configuration of catalytic reactor 700*a* offers several advantages in addition to those already mentioned above. In particular, use of tubular reactors connected in series allows for dependable and consistent parameters, which allows for a consistent product. Specifically, a consistent flow through the tubular sections creates a much more predictable and narrow range of end products than using a continuous stirred reactor, as the surface area of the catalyst and heat input is maximized. One advantage over continuous stirred reactors is elimination or at least reduction of shortcutting, flow in tubular section hypothetically moves as a plug. Each hypothetical plug spends the same amount of time in the reactor. Tubular catalytic reactors can be operated vertically, horizontally, or at any angle in between. Tubular catalytic reactors (the reactor sections) and the corresponding pre-heat sections and cooling sections (see FIGS. 28-30) can be a universal size (or one of several standard sizes). This allows not only for a consistent flow of the material, but also allows for tubular elements to be designed to be interchangeable among the various section and easily added, removed, cleaned, and repaired. In at least some embodiments the inner face of the tubular sections is made of 304 or 316 steel.

The thermal fluid and/or molten salt can enter jacket 720 via inlet/outlets 730. In some embodiments, catalytic reactor 700*a* is configured to be mounted with a thermocouple/pressure transducer (not shown) and includes relevant notches 735. Notches 735 are used to bring the thermocouple/pressure transducer in physical contact with the fluid. In some embodiments, the thermocouple/pressure transducer will be mounted in a well, which reduces the material in-between the fluid and the sensor.

In some embodiments, catalytic reactor 700*a* includes removable screen 760 that can hold the catalyst. Removable screen 760 can be easily replaced overcoming disadvantages associated with packed bed reactors challenging maintenance requirements and resulting downtime. In some embodiments, the standardization of removable screen 760 results in a consistent product leaving each section and/or allows for standardization across multiple reactors.

In other or the same embodiments, catalytic reactor 700*a* can include removable adaptor 740 with cut-outs for static mixer supports. Static mixer supports reduce the force on static mixers 710 allowing for more forceful/rapid removal. The cut-outs of adaptor 740 improve the seal between the adapter and the screens. Catalytic reactor 700*a* can include flanges 750 on one or both ends to connect catalytic reactor 700*a* to other reactors, extruders or the like.

Figure 20:
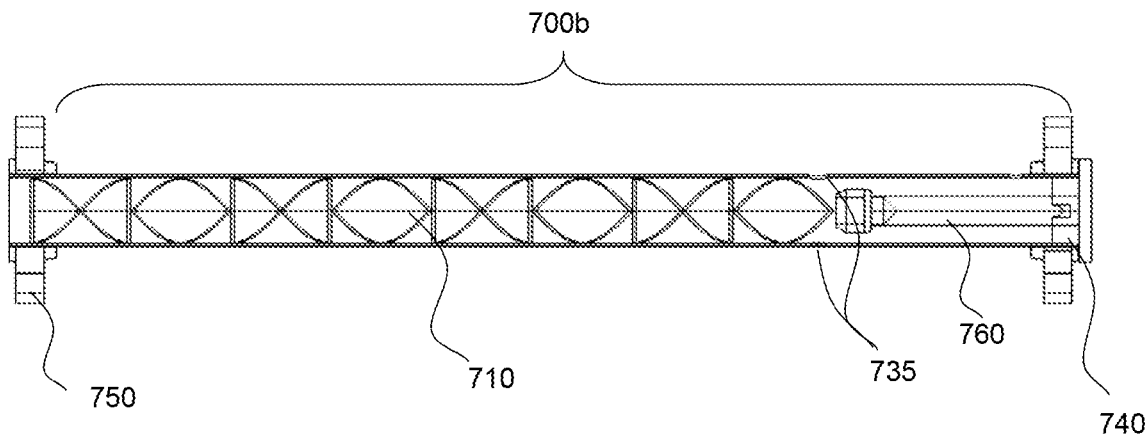
FIG. 20 is a cross-section side-elevation view of a catalytic reactor with a removable static mixer configured to use electric heating.

FIG. 20 is a cross-section side-elevation view of catalytic reactor 700*b* with removable static mixer 710 configured to use electric heating. In some embodiments, electric heating is preferred over using thermal oil/molten salt as it can be more convenient, requires reduced ancillary equipment such as boilers, heating vessels, high temperature pumps, valves, and fittings, and is easier to operate. Further, in some embodiments, reduce of electric heating reduces the overall footprint of the system. In some embodiments, catalytic reactor 700*b* is configured to be mounted with a thermocouple/pressure transducer (not shown) and includes relevant notches 735.

In some embodiments, catalytic reactor 700*b* includes removable screen 760 that can hold the catalyst. In other or the same embodiments, catalytic reactor 700*b* can include removable adaptor 740 with cut-outs for static mixer supports. Catalytic reactor 700*b* can include flanges 750 on one or both ends to connect catalytic reactor 700*b* to other reactors, extruders or the like.

Figure 21:
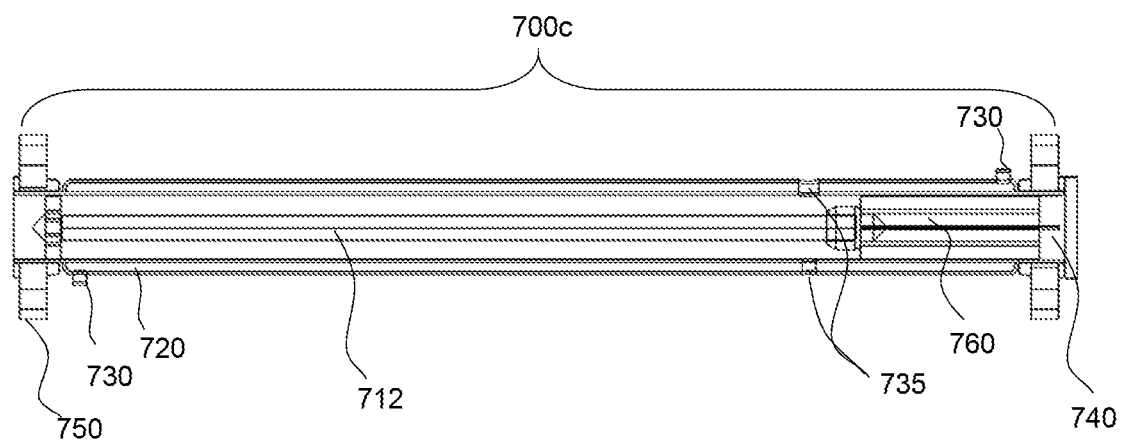
FIG. 21 is a cross-section side-elevation view of a catalytic reactor with a removable annular insert configured to be heated via thermal fluid/molten salt.

FIG. 21 is a cross-section side-elevation view of catalytic reactor 700*c* with removable annular insert 712 configured to be heated via thermal fluid and/or molten salt. Annular insert 712 can create an annular flow which can lead to improved heat transfer, increases in superficial velocity and can be easier to maintain than an empty reactor.

The thermal fluid and/or molten salt can enter jacket 720 via inlet/outlets 730. In some embodiments, catalytic reactor 700*c* is configured to be mounted with a thermocouple/pressure transducer (not shown) and includes relevant notches 735.

In some embodiments, catalytic reactor 700*c* includes removable screen 760 that can hold the catalyst. In other or the same embodiments, catalytic reactor 700*c* can include removable adaptor 740 with cut-outs for removable annular and screen support. Catalytic reactor 700*c* can include flanges 750 on one or both ends to connect catalytic reactor 700*c* to other reactors, extruders or the like.

Figure 22:
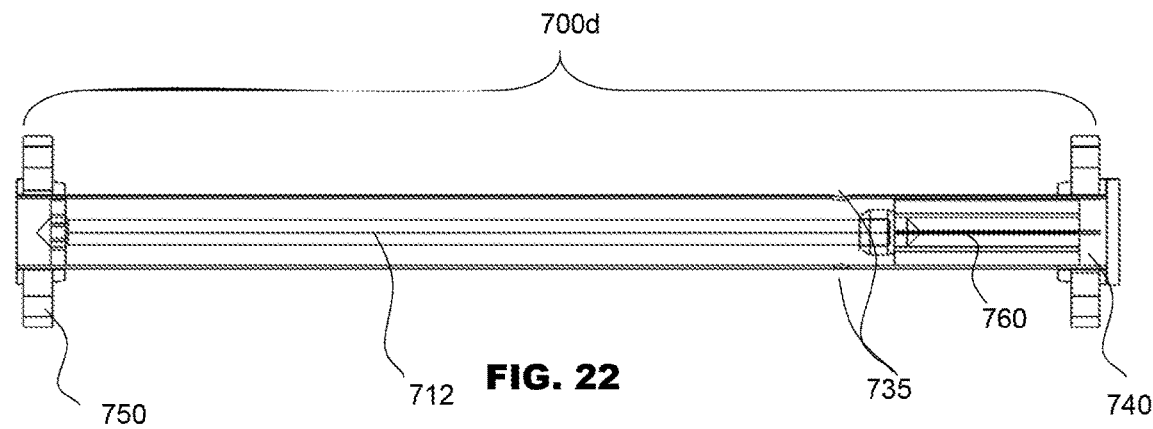
FIG. 22 is a cross-section side-elevation view of a catalytic reactor with a removable annular insert configured to use electric heating.

FIG. 22 is a cross-section side-elevation view of catalytic reactor 700*d* with removable annular 712 insert configured to use electric heating. In some embodiments, catalytic reactor 700*d* is configured to be mounted with a thermocouple/pressure transducer (not shown) and includes relevant notches 735.

In some embodiments, catalytic reactor 700*d* includes removable screen 760 that can hold the catalyst. In other or the same embodiments, catalytic reactor 700*d* can include removable adaptor 740 with cut-outs for removable annular and screen support. Catalytic reactor 700*d* can include flanges 750 on one or both ends to connect catalytic reactor 700*d* to other reactors, extruders or the like.

Figure 23:
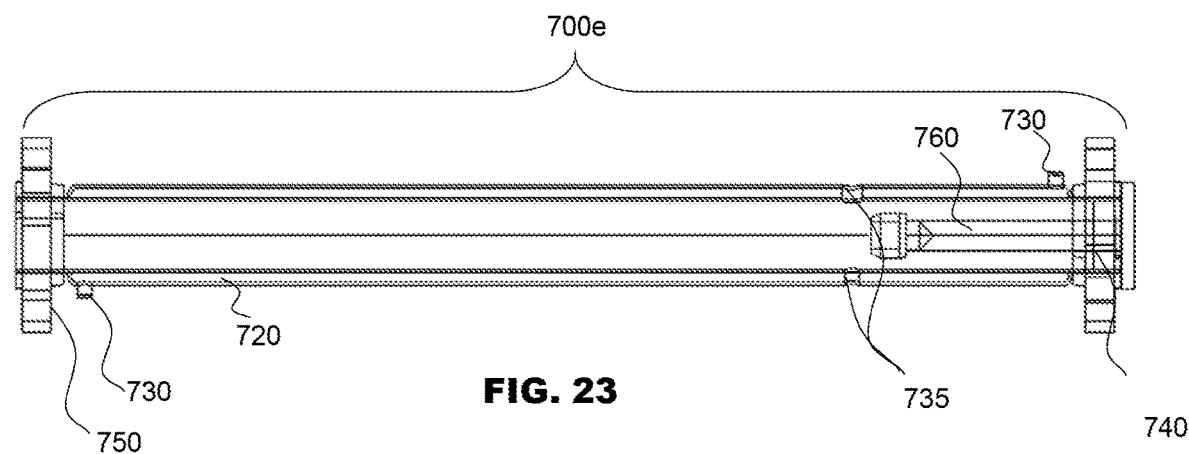
FIG. 23 is a cross-section side-elevation view of a catalytic reactor with empty internals configured to be heated via thermal fluid/molten salt.

FIG. 23 is a cross-section side-elevation view of a catalytic reactor 700*e* with empty internals configured to be heated via thermal fluid and/or molten salt. Having a reactor with empty internals can increases the residence time of a given material spends in reactor 700*e* which reduces the number of reactors needed to make a specific product along with the volume of the catalyst that can be used. Reactors with empty internals can also be more economic to manufacture when compared to reactors with static mixers. The thermal fluid and/or molten salt can enter jacket 720 via inlet/outlets 730. In some embodiments, catalytic reactor 700*e* is configured to be mounted with a thermocouple/pressure transducer (not shown) and includes relevant notches 735.

In some embodiments, catalytic reactor 700e includes removable screen 760 that can hold the catalyst. In other or the same embodiments, catalytic reactor 700e can include removable adaptor 740 with cut-outs for removable screen support. Catalytic reactor 700e can include flanges 750 on one or both ends to connect catalytic reactor 700e to other reactors, extruders or the like.

Figure 24:
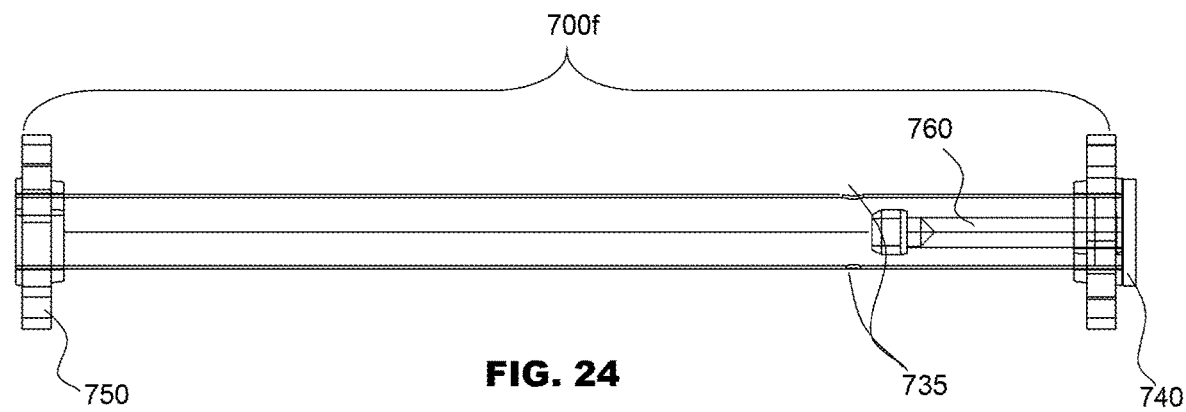
FIG. 24 is a cross-section side-elevation view of a catalytic reactor with empty internals configured to use electric heating.

FIG. 24 is a cross-section side-elevation view of catalytic 700f reactor with empty internals configured to use electric heating. In some embodiments, catalytic reactor 700f is configured to be mounted with a thermocouple/pressure transducer (not shown) and includes relevant notches 735.

In some embodiments, catalytic reactor 700f includes removable screen 760 that can hold the catalyst. In other or the same embodiments, catalytic reactor 700f can include removable adaptor 740 with cut-outs for screen support. Catalytic reactor 700f can include flanges 750 on one or both ends to connect catalytic reactor 700f to other reactors, extruders or the like.

Figure 25:
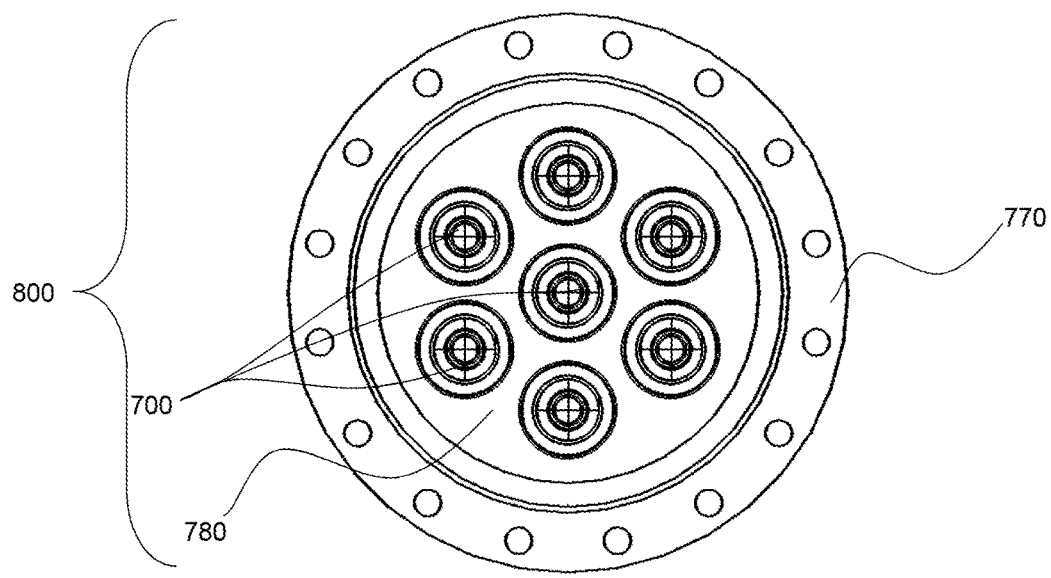
FIG. 25 is a cross-section front-elevation view of a group of catalytic reactors like those shown in FIG. 19 to 24 arranged in parallel.

FIG. 25 is a cross-section front-elevation view of a group of catalytic reactors 700 like the one shown in FIG. 19 arranged in parallel. Parallel arrangements such as that shown in FIG. 25 allow for the total rate of production to be more readily increase/decreased as desired with minimal changes to the overall arrangement and allow multiple different levels of depolymerisation to occur at once.

Housing 800 allows catalytic reactors 700 to be bathed in thermal oil/molten salt which is often more effective than electric. The thermal oil/molten salt is held in chamber 780. In some embodiments flange 770 allows for multiple housings to be joined together.

Figure 26:
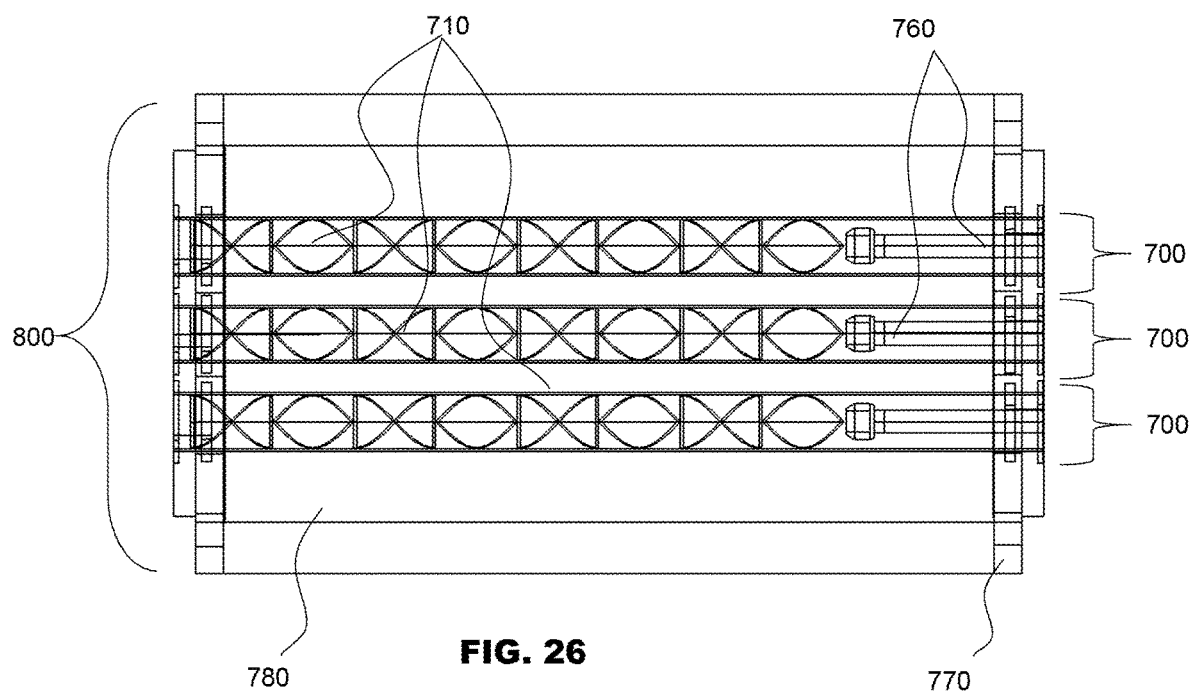
FIG. 26 is a cross-section side-elevation view of the parallel catalytic reactor arrangement of FIG. 25 show in a horizontal configuration.

FIG. 26 is a cross-section side-elevation view of the parallel catalytic reactor arrangement of FIG. 25 show in a horizontal configuration. Parallel arrangement allows for higher flowrate units to be built with smaller pressure drops that could cause issues as compared to a single tube arrangements. Horizontal configurations are often more convenient to operate/maintain.

Figure 27:
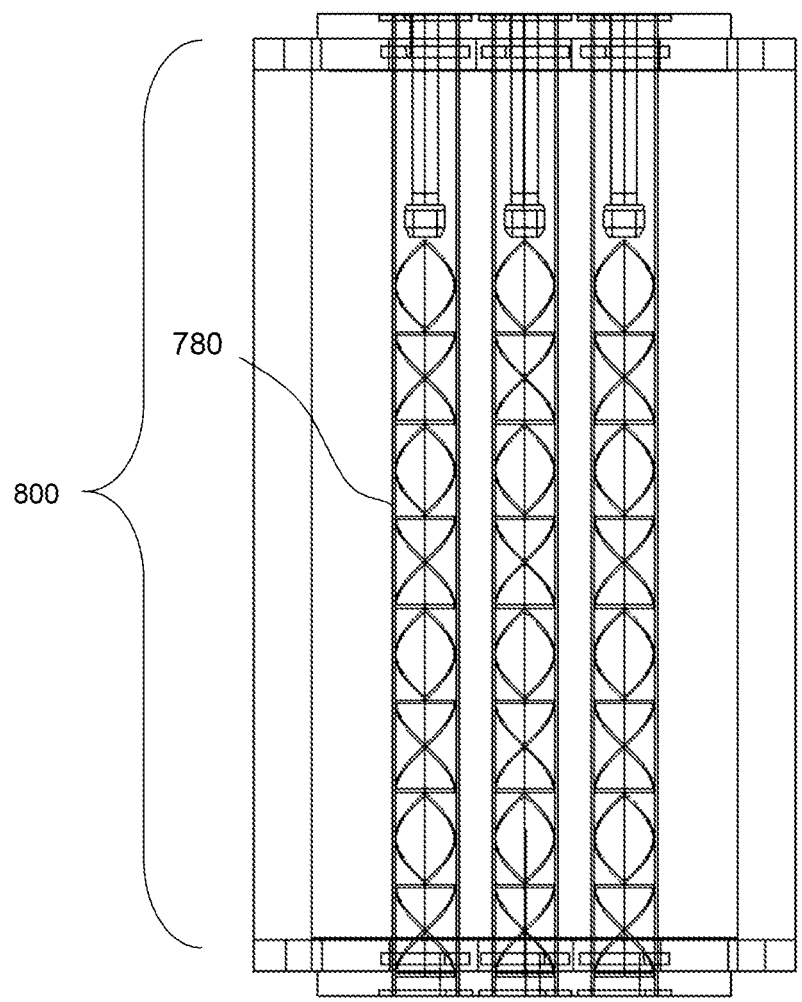
FIG. 27 is a cross-section side-elevation view of the parallel catalytic reactor arrangement of FIG. 25 show in a vertical configuration.

FIG. 27 is a cross-section side-elevation view of the parallel catalytic reactor arrangement of FIG. 25 show in a vertical configuration. Vertical configurations can reduce stratification of liquid/gas products, and can eliminate or at least reduce a need for static mixers.

Figure 28:
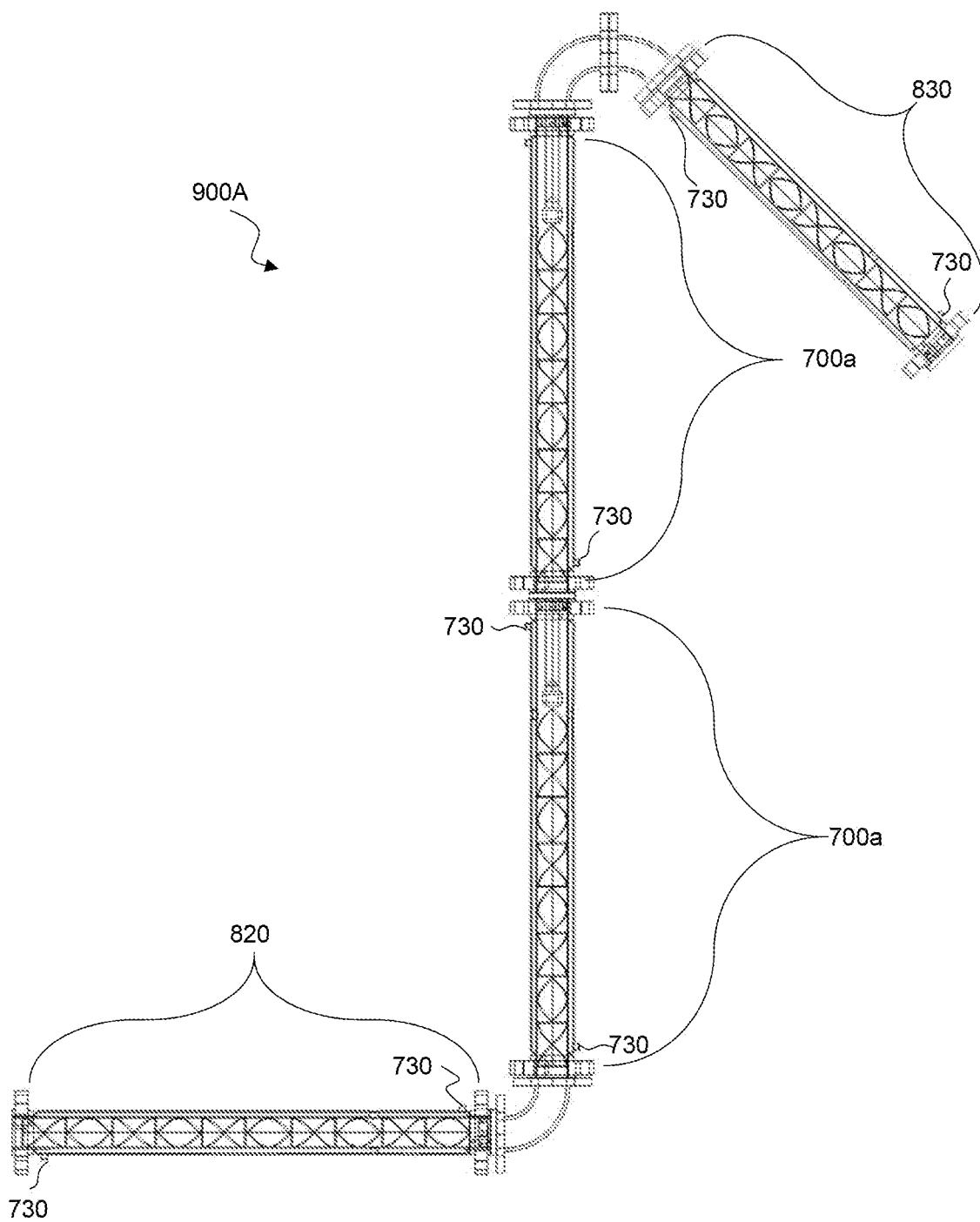
FIG. 28 is a cross-section side-elevation view of a vertical helical internal catalytic reactor arrangement with two reactors connected in series.

FIG. 28 is a cross-section side-elevation view of vertical helical internal catalytic reactor arrangement 900A with two reactors 700a like the one shown in FIG. 19 connected in series. Horizontal helical mixer pre-heat section 820 is connected to one reactor 700a. Helical mixers can lead to better mixing by avoiding stagnancies and hot spots.

Helical mixer cooling segment 830 is shown connected to the other reactor 700a at a 45-degree decline. The decline allows for the product to flow via a gravity, while the 45-degree angle allows for sufficient contact between the cooling medium and the product.

In the embodiments shown, vertical helical internal catalytic reactor arrangement 900A has several inlet/outlets to allow for the use of thermal fluid/molten salt mixtures however other warming techniques (such as, but not limited to, electric heating) can be used as well.

Figure 29:
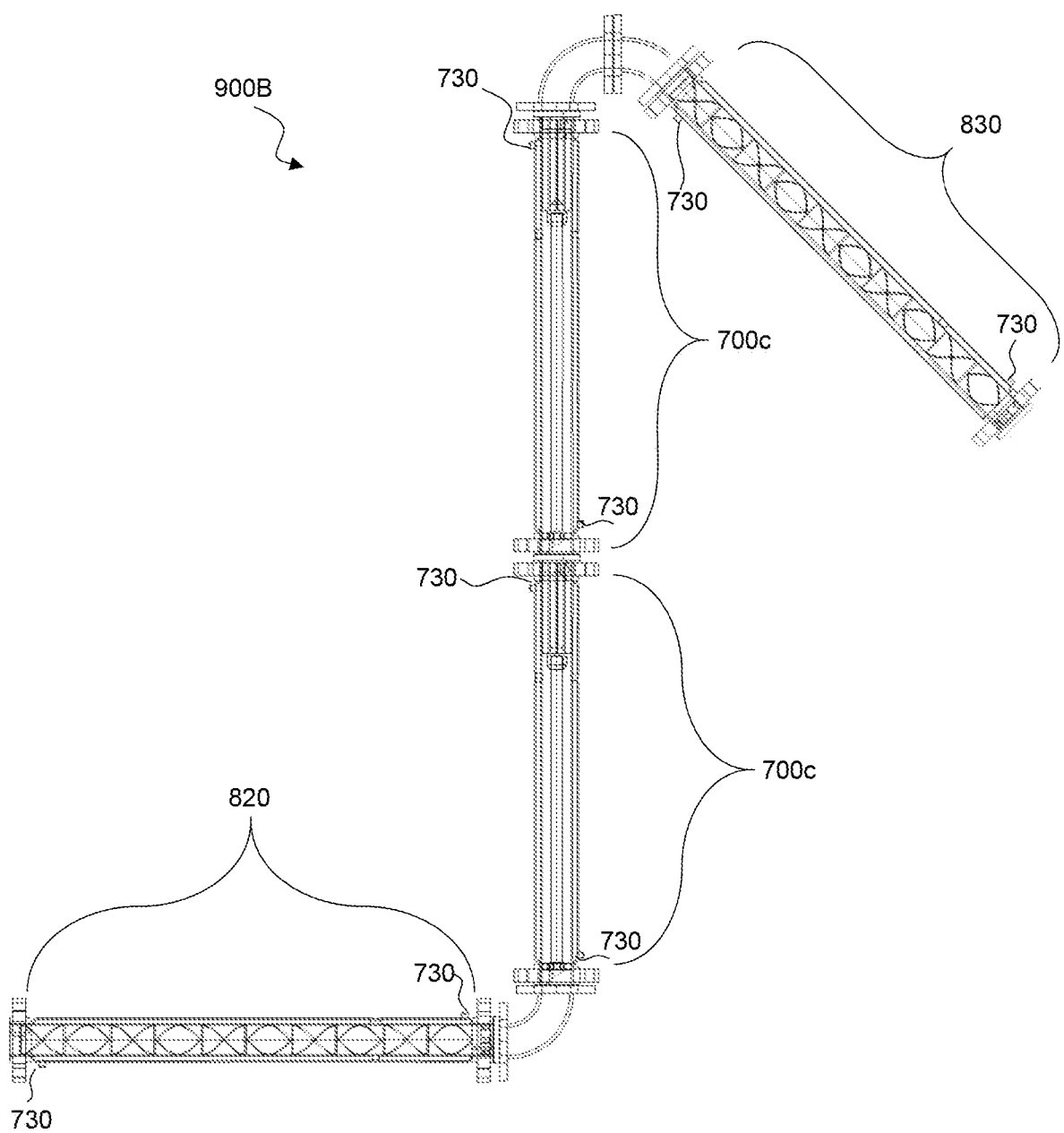
FIG. 29 is a cross-section side-elevation view of a vertical annular catalytic reactor arrangement with two reactors connected in series.

FIG. 29 is a cross-section side-elevation view of a vertical annular catalytic reactor arrangement 900B with two reactors 700c like the one shown in FIG. 21 connected in series.

Figure 30:
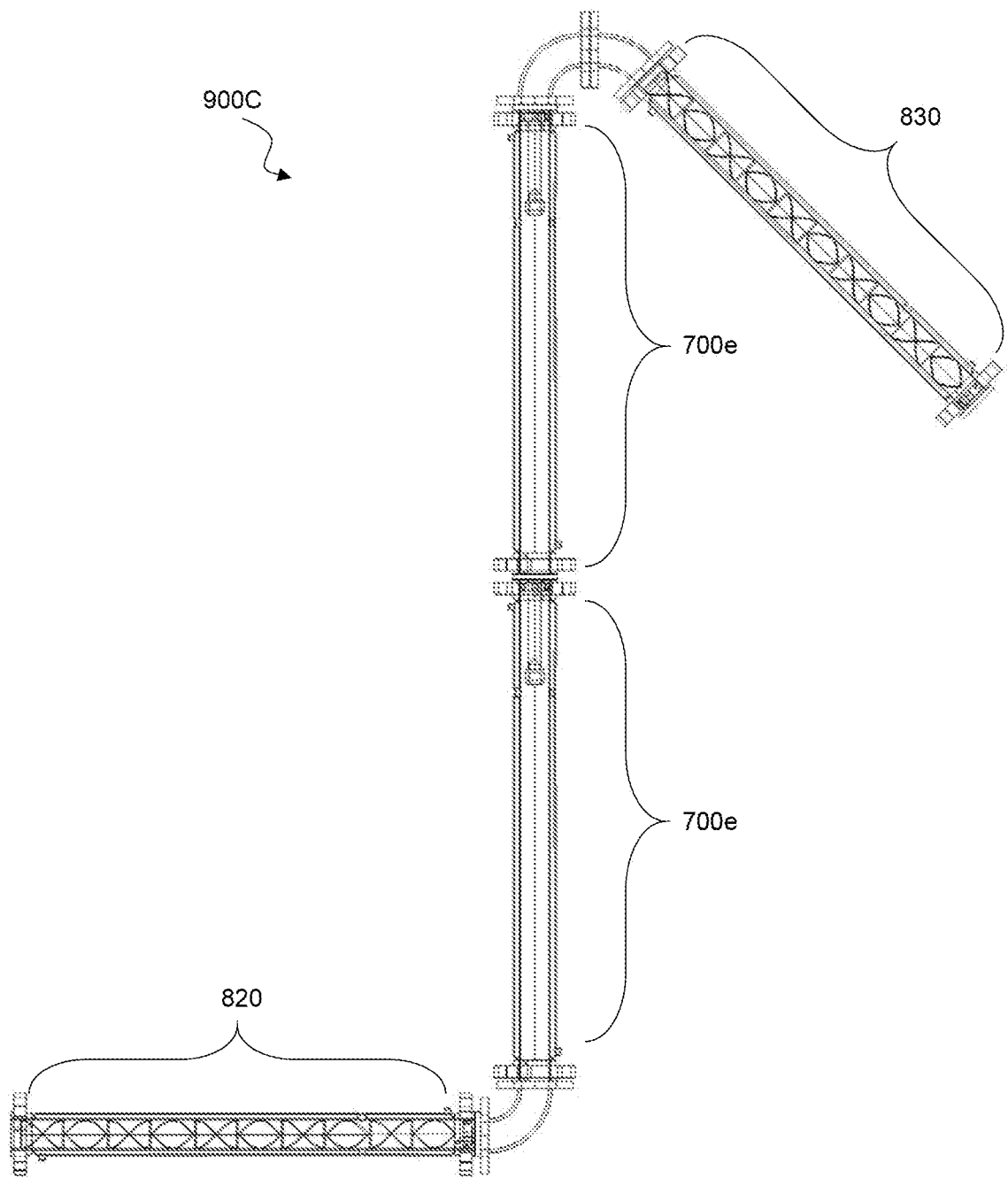
FIG. 30 is a cross-section side-elevation view of a vertical catalytic reactor arrangement with two empty reactors connected in series.

FIG. 30 is a cross-section side-elevation view of a vertical catalytic reactor arrangement 900C with two empty reactors 700f like the one shown in FIG. 23 connected in series.

Figure 31:
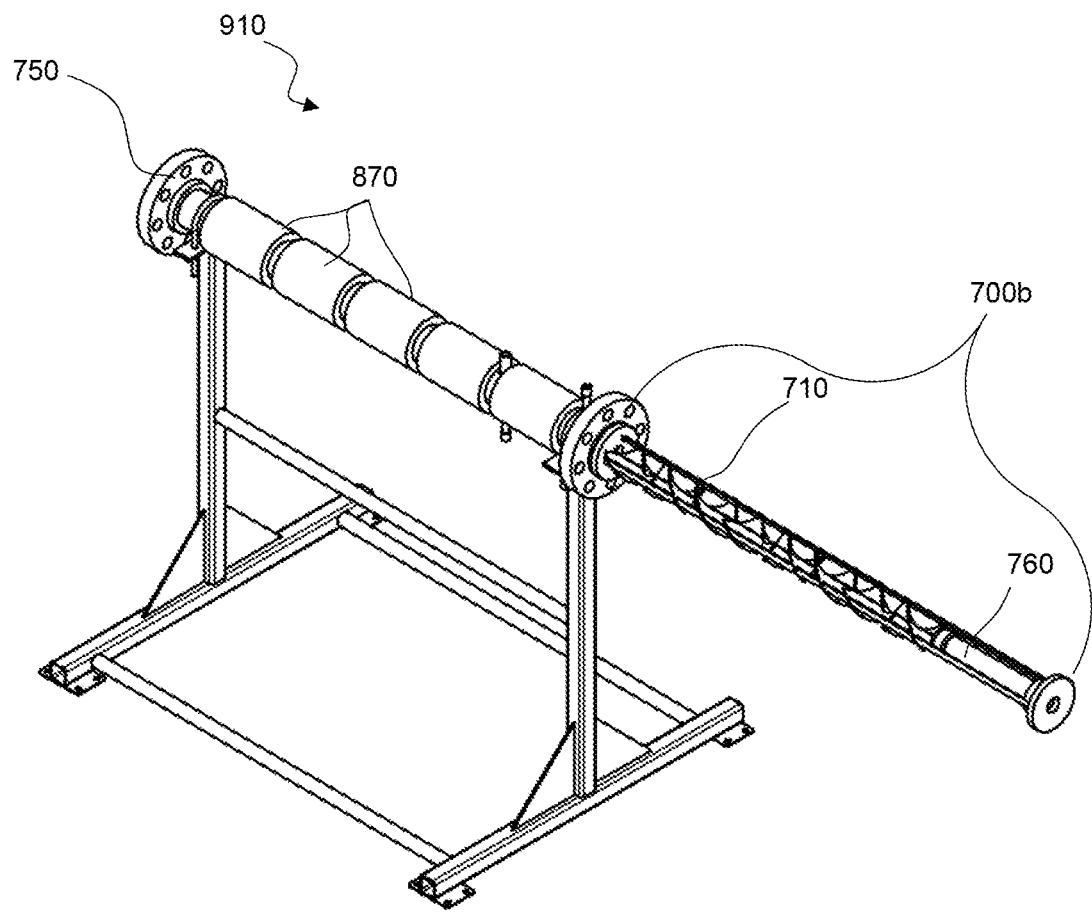
FIG. 31 is a perspective view of a horizontal reactor with an internal removable helical mixer.

FIG. 31 is a perspective view of horizontal reactor configuration 910 with internal helical reactor 700b configured to use electric heaters 870 like the one shown in FIG. 20. In FIG. 31 the reactor shell has been removed from part of horizontal reactor configuration 910 to aid in visualizing the location of internal helical reactor 700b.

While particular elements, embodiments and applications of the present invention have been shown and described, it will be understood, that the invention is not limited thereto since modifications can be made without departing from the scope of the present disclosure, particularly in light of the foregoing teachings. For example, the numerous embodiments demonstrate that different combinations of components are possible within the scope of the claimed invention, and these described embodiments are demonstrative and other combinations of the same or similar components can be employed to achieve substantially the same result in substantially the same way. Further, all of the claims are hereby incorporated by reference into the description of the preferred embodiments.

What is claimed is:

1. A method for continuously treating recycled polymeric material comprising:
   continuously feeding a recycled polymeric material into a system using a hopper;
   heating said recycled polymeric material in an extruder to continuously turn said recycled polymeric material into a molten material;
   continuously filtering said molten material with a filter system;
   continuously depolymerizing said molten material into a first wax using a first reactor; and
   continuously depolymerizing said molten material into a second wax using a second reactor.

2. The method of claim 1 wherein said first wax has a melting point between 106 degrees Celsius and 135 degrees Celsius.

3. The method of claim 1 wherein said recycled polymeric material comprises crosslinked polyethylene.

4. The method of claim 1 wherein said method further comprises degassing said first wax with nitrogen.

5. The method of claim 1 wherein said recycled polymeric material comprises polyethylene.

6. The method of claim 1 wherein said recycled polymeric material comprises polypropylene.

7. The method of claim 1 wherein said recycled polymeric material comprises polystyrene.

8. The method of claim 1 wherein said depolymerization utilizes a catalyst.

9. The method of claim 1 wherein said first wax has a melting point between 86 degrees Celsius to 105 degrees Celsius.

10. The method of claim 1 further comprising:
    continuously cooling said first wax via a heat exchanger.

11. The method of claim 1 further comprising:
    continuously purifying said first wax via a purifier system.

12. The method of claim 1 further comprising:
    wherein said second wax is different from said first wax,
    wherein said first reactor and said second reactor are connected in parallel.

13. The method of claim 1 further comprising:
    continuously depolymerizing said molten material into a third wax using a third reactor
    wherein said second wax is different from said first wax, and
    wherein said first reactor, said second reactor, and said third reactor are connected in parallel.

14. The method of claim 13 wherein said second reactor has a first dimension and said third reactor has a second dimension, wherein said first dimension and said second dimension differ such that said second wax is different from said third wax.

15. The method of claim 13 wherein said first reactor, said second reactor, and said third reactor are in a vertical configuration.

16. The method of claim 13, wherein said first wax has a melting point between 86 degrees Celsius to 105 degrees Celsius and wherein said second wax has a melting point between 106 degrees Celsius and 135 degrees Celsius.

17. The method of claim 8 wherein said recycled polymeric material comprises polyethylene.

18. The method of claim 8 wherein said recycled polymeric material comprises polypropylene.

19. The method of claim 8 wherein said recycled polymeric material comprises polystyrene.

* * * * *